（12） United States Patent
Dixit et al.

(10) Patent No.: US 6,735,609 B2
(45) Date of Patent: May 11, 2004

(54) INVERSE DISCRETE-COSINE TRANSFORM APPARATUS

(75) Inventors: Rajesh Kumar Dixit, Tokyo (JP); Takao Terao, Kanagawa (JP); Hiroshi Sugawara, Kanagawa (JP); Masami Goseki, Tokyo (JP); Kazushi Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 380 days.

(21) Appl. No.: 09/794,296

(22) Filed: Feb. 27, 2001

(65) Prior Publication Data

US 2002/0010729 A1 Jan. 24, 2002

(30) Foreign Application Priority Data

Feb. 29, 2000 (JP) ........................................ 2000-055051
Nov. 9, 2000 (JP) ........................................ 2000-342447

(51) Int. Cl.$^7$ .............................................. G06F 17/14
(52) U.S. Cl. ........................................................ 708/402
(58) Field of Search ........................................ 708/402

(56) References Cited

U.S. PATENT DOCUMENTS 5,673,214 A * 9/1997 Kim et al. .................. 708/402
5,764,553 A * 6/1998 Hong ......................... 708/402
6,052,703 A * 4/2000 Redford ..................... 708/402
6,295,320 B1 * 9/2001 Lim et al. ................... 708/402
6,460,061 B1 * 10/2002 Dick .......................... 708/402

* cited by examiner

Primary Examiner—Tan V. Mai
(74) Attorney, Agent, or Firm—Frommer Lawrence & Haug LLP; William S. Frommer

(57) ABSTRACT

An inverse discrete-cosine transform apparatus that is simple in structure and can yet output pixel data items different in resolution. The apparatus comprises eight inverse discrete-cosine transform multipliers 23, ten field, compression, inverse discrete-cosine transform multipliers 22, eight selectors 24, eight selectors 25, eight buffers 26, eight sign multipliers 27, a control section, eight adders 28, and eight buffers 29. The control section controls the selectors 24, selectors 25, buffers 26 and sign multipliers 27 in accordance with whether the input discrete-cosine block has been subjected to field division and where the discrete-cosine coefficients are located in the block. One of the values input to the selectors 24, selectors 25, buffers 26 and sign multipliers 27 is thereby selected. The value selected is output after added with the plus sign or the minus sign. The adders 28 add the values output from the selectors 24, selectors 25, buffers 26 and sign multipliers 27. The buffers 29 store the values output from the adders 28.

4 Claims, 8 Drawing Sheets

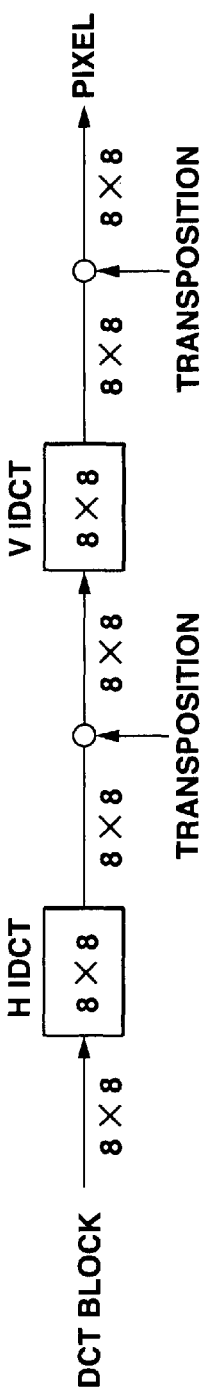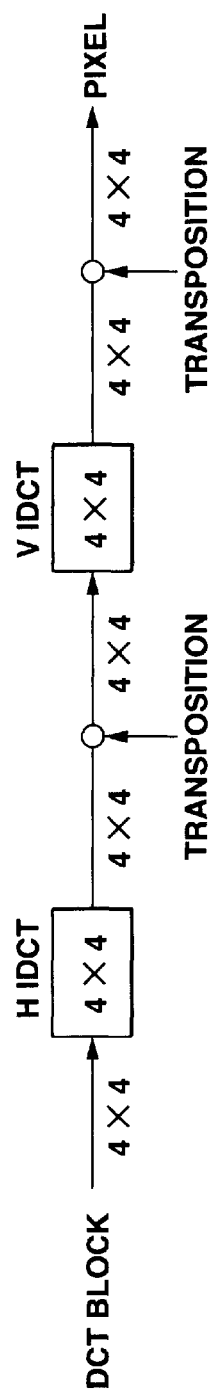

INVERSE DISCRETE-COSINE TRANSFORM APPARATUS

BACKGROUND OF THE INVENTION

The present invention relates to an inverse discrete-cosine transform apparatus for transforming input discrete cosine coefficients to inverse discrete-cosine coefficients.

An inverse discrete-cosine transform apparatus is incorporated into an image-decoding apparatus that is designed to decode compressed image data. In the image-decoding apparatus, the inverse discrete-cosine transform apparatus transforms image data provided in the form of discrete-cosine coefficients, into inverse discrete-cosine coefficients.

More precisely, the inverse discrete-cosine transform apparatus transforms input coefficients, in units of discrete-cosine blocks, thereby to generate image data. Each discrete-cosine block is, for example, an 8×8 matrix that is composed of discrete-cosine coefficients arranged in rows and columns.

Discrete-cosine coefficients can be transformed to inverse discrete-cosine coefficients by applying the following equation (1) of inverse transform:

$$S_{xy} = \sum_{u=D}^{7} \sum_{v=D}^{7} C_u C_v D_{uv} \cos\frac{(2x+1)u\pi}{16} \cos\frac{(2y+1)v\pi}{16} \quad (1)$$

$$\begin{cases} Cu = Cv = \frac{1}{\sqrt{2}} u = v = 0 \\ Cu = Cv = 1 u, v1, 2 \ldots, 7 \end{cases}$$

where $D_{uv}$ is the discrete-cosine coefficients, i.e., the elements of a discrete-cosine block, $S_{xy}$ is pixel data. In the symbol $D_{uv}$, and v indicate the horizontal component and vertical component of the discrete-cosine block, respectively. Similarly, in the symbol, x and y indicate the horizontal component and vertical component of the pixel data, respectively.

As seen from the equation (1), the inverse discrete-cosine transform can be accomplished by performing matrix calculus on discrete-cosine coefficients and inverse discrete-cosine coefficients. Hence, the inverse discrete-cosine transform apparatus may have a matrix algebraic circuit that comprises multipliers and adders. In this case, the apparatus can effect inverse discrete-cosine transform on an input image of standard resolution or high resolution, which has been subjected to discrete-cosine transform, thereby to generate image data that has the same resolution as the input image.

To provide such a matrix algebraic circuit, various methods have been devised. Each method is designed to reduce the number of operations that the matrix algebraic circuit needs to perform. In November 1984 Mr. Beyong Gi Lee published a fast cosine transform (FCT) algorithm in IEEE Transaction on Acoustics, Speech and Signal Processing, Vol. 32, No. 6, pp. 1243. This algorithm describes a method of reducing the number of necessary operations. A circuit, designed totally on the basis of the algorithm, has been developed.

Thus, a fast algorithm optimal for an inverse discrete-cosine transform of discrete-cosine blocks of a specific size, for example 8×8 inverse discrete-cosine blocks, may be formulated and applied. Then, it is possible to provide a small, high-speed matrix algebraic circuit.

An inverse discrete-cosine transform apparatus is known which converts a high-resolution image subjected to discrete-cosine transform, to an image having standard resolution. That is, the apparatus accomplishes compression inverse discrete-cosine transform. Japanese Patent Application Publication No. 2000-041261 discloses an inverse discrete-cosine transform apparatus of this type.

Compression inverse discrete-cosine transform may be performed on a discrete-cosine block subjected to discrete-cosine transform in field discrete-cosine mode, thereby providing first pixel data. Further, compression inverse discrete-cosine transform may be carried out on a discrete-cosine block subjected to discrete-cosine transform in frame discrete-cosine mode, thereby providing second pixel data. The first pixel data and the second pixel data, thus provided, inevitably have a phase difference in the vertical direction. If an image-decoding apparatus incorporates an inverse discrete-cosine transform apparatus that effects the same compression inverse discrete-cosine transform on these two discrete-cosine blocks of different types, the quality of the image the apparatus outputs will deteriorate.

In order to eliminate the phase difference in the vertical direction, two types of compression inverse discrete-cosine transform apparatuses have been invented. The first type is a field-mode, compression, inverse discrete-cosine transform apparatus that performs compression inverse discrete-cosine transform on a discrete-cosine block subjected to discrete-cosine transform in field discrete-cosine mode. The second type is a frame-mode, compression, inverse discrete-cosine transform apparatus that divides a discrete-cosine block subjected to discrete-cosine transform in frame discrete-cosine mode, into fields, thereby to accomplish the compression inverse discrete-cosine transform on the discrete-cosine block.

The field-mode, compression, inverse discrete-cosine transform apparatus will be described first, which performs compression inverse discrete-cosine transform on a discrete-cosine block subjected to discrete-cosine transform in field discrete-cosine mode.

The field-mode, compression, inverse discrete-cosine transform apparatus receives an 8×8 discrete-cosine block input in the form of a bit stream. The apparatus then performs inverse discrete-cosine transform on only the lower 4×4 coefficients of the 8×8 discrete-cosine block. In other words, the apparatus performs compression inverse discrete-cosine transform on the basis of four lower points existing in a lower region with respect to both the horizontal and the vertical direction. The field-mode, compression, inverse discrete-cosine transform apparatus can convert one discrete-cosine block to 4×4 pixel data as it carries out the compression inverse discrete-cosine transform.

It will be described how the frame-mode, compression, inverse discrete-cosine transform apparatus divides a discrete-cosine block subjected to discrete-cosine transform in frame discrete-cosine mode, into fields, thereby to accomplish compression inverse discrete-cosine transform on the discrete-cosine block.

As shown in FIG. 1, the frame-mode, compression, inverse discrete-cosine transform apparatus receives a bit stream that has been generated by compressing and encoding a high-resolution image. The bit stream is input to the apparatus, in the form of a discrete-cosine block.

First, in Step S1, the apparatus performs 8×8 inverse discrete-cosine transform on the discrete-cosine coefficients y of the discrete-cosine block. (Of all discrete-cosine coefficients of the block, only those in the vertical direction are shown as $y_1$ to $y_8$ in FIG. 1.) As a result, 8×8 pixel data x is decoded. (Of all pixel data items of the block, only those in the vertical direction are shown as items $x_1$ to $x_8$ in FIG. 1.)

In Step S2, the pixel data items are alternately extracted in the vertical direction, thus dividing the 8×8 pixel data into a 4×4 top-field pixel block and a 4×4 bottom-field pixel block, which correspond to pixel blocks obtained by interlaced scanning. More specifically, pixel data items $x_1$, $x_3$, $x_5$ and $X_7$ for the first, third, fifth and seventh horizontal lines, respectively, are extracted and combined, thus forming a pixel block that corresponds to a top field. Pixel data items $X_2$, $X_4$, $X_6$ and $x_8$ for the second, fourth, sixth and eighth horizontal lines, respectively, are extracted and combined, forming a pixel block that corresponds to a bottom field. This process of dividing the pixels of a discrete-cosine block into two pixel blocks that correspond to interlaced-scan pixel blocks is called "field division" (also known as "field separation").

In Step S3, the apparatus carries out 4×4 discrete-cosine transform (DCT4×4) on the two pixel blocks that have been generated by means of field division.

In Step S4, the apparatus extracts the higher ones of the discrete-cosine coefficients z for the top-field pixel block generated by effecting the 4×4 discrete-cosine transform. (Of all coefficients of the top-field pixel block, only the discrete-cosine coefficients in the vertical direction are shown as $z_1$, $Z_3$, $Z_5$ and $Z_7$ in FIG. 1.) The higher discrete-cosine coefficients extracted are combined, forming a pixel block composed of 2×2 discrete-cosine coefficients. Also, the apparatus extracts the higher ones of the discrete-cosine coefficients z for the bottom-field pixel block generated by effecting the 4×4 discrete-cosine transform. (Of all coefficients of the bottom-field pixel block, only the discrete-cosine coefficients in the vertical direction are shown as $Z_2$, $Z_4$, $Z_6$ and $Z_8$ in FIG. 1.) The higher discrete-cosine coefficients extracted are combined, forming a pixel block composed of 2×2 discrete-cosine coefficients.

In Step S5, the apparatus effectuates 2×2 inverse discrete-cosine transform (IDCT 2×2) on the pixel block composed of the higher discrete-cosine coefficients that have been extracted from the top-field pixel block. As a result, 2×2 pixel data x' is decoded. (Of all pixel data items of the top-field pixel block, only those in the vertical direction are shown as items $x'_1$ and $X'_3$ in FIG. 1. Also, of all pixel data of the bottom-field pixel block, only the pixel data in the vertical direction are shown as items $x'_2$ and $x'_4$ in FIG. 1.)

In Step S6, the pixel data items of the top-field pixel block and the pixel data items of the bottom-field pixel block are alternately selected for each line and synthesized in the vertical direction, thus performing compression inverse discrete-cosine transform. A discrete-cosine block composed of 4×4 pixel data items is thereby generated. This process of selecting the pixel data items of the top-field and bottom-field pixel blocks and combining them in the vertical direction shall be called "frame synthesis."

Performing Steps S1 to S6, the frame-mode, compression, inverse discrete-cosine transform apparatus can generate pixel data that is in the same phase as the pixel data generated in the field-mode, compression, inverse discrete-cosine transform apparatus.

The frame-mode, compression, inverse discrete-cosine transform apparatus effects Steps S1 to S6 by using a single matrix. To state it more specifically, the apparatus executes matrix calculus on the matrix [FS] of the following equation (2) and the discrete-cosine coefficients y ($Y_1$ to $Y_8$) of a discrete-cosine block, generating the pixel data x' (items $x'_1$ to $x'_4$) of a discrete-cosine block obtained by compression inverse discrete-cosine transform. Note that matrix [FS] has been formed as the above-mentioned process is carried out by applying addition theorem.

$$[FS] = \frac{1}{\sqrt{2}} \begin{bmatrix} A & B & D & -E & F & G & H & I \\ A & -C & -D & E & -F & -G & -H & -J \\ A & C & -D & -E & -F & G & -H & J \\ A & -B & D & E & F & -G & H & -I \end{bmatrix} \quad (2)$$

A to J in the equation (2) are as follows:

$$A = \frac{1}{\sqrt{2}} \quad D = \frac{1}{4} \quad H = \frac{1}{4} + \frac{1}{2\sqrt{2}}$$

$$B = \frac{\cos\frac{\pi}{16} + \cos\frac{3\pi}{16} + 3\cos\frac{5\pi}{16} - \cos\frac{7\pi}{16}}{4}$$

$$E = \frac{\cos\frac{\pi}{16} - \cos\frac{3\pi}{16} - \cos\frac{5\pi}{16} - \cos\frac{7\pi}{16}}{4}$$

$$I = \frac{\cos\frac{\pi}{16} - \cos\frac{3\pi}{16} + 3\cos\frac{5\pi}{16} + \cos\frac{7\pi}{16}}{4}$$

$$F = \frac{\cos\frac{\pi}{8} - \cos\frac{3\pi}{8}}{4}$$

$$C = \frac{\cos\frac{\pi}{16} - 3\cos\frac{3\pi}{16} - \cos\frac{5\pi}{16} - \cos\frac{7\pi}{16}}{4}$$

$$G = \frac{\cos\frac{\pi}{16} - \cos\frac{3\pi}{16} + \cos\frac{5\pi}{16} + \cos\frac{7\pi}{16}}{4}$$

$$J = \frac{\cos\frac{\pi}{16} + 3\cos\frac{3\pi}{16} - \cos\frac{5\pi}{16} + \cos\frac{7\pi}{16}}{4}$$

Fast algorithm may be used to effectuate the 4×4 compression inverse discrete-cosine transform in the field-mode, compression, inverse discrete-cosine transform apparatus and to perform Steps S1 to S6, i.e., compression inverse discrete-cosine transform, in the frame-mode, compression, inverse discrete-cosine transform apparatus.

In both apparatuses, applying a fast algorithm can carry out the compression inverse discrete-cosine transform. An example of a fast algorithm is the Wang algorithm (see Zhong DE Wang., "Fast Algorithms for the Discrete W Transform and for the Discrete Fourier Transform", IEEE Tr. ASSP-32, No. 4, pp. 803–816, Aug. 1984).

The matrix representing the compression discrete-cosine transform that the field-mode, compression, inverse discrete-cosine transform apparatus executes can be decomposed as shown in the following equation (3), by applying the Wang algorithm:

$$[C_d^{II}]^{-1}[C_d^{III}] = \frac{1}{\sqrt{2}} \begin{bmatrix} 1 & 0 & 0 & 1 \\ 0 & 1 & 1 & 0 \\ 0 & 1 & -1 & 0 \\ 1 & 0 & 0 & -1 \end{bmatrix} \begin{bmatrix} [C_2^{III}] & \\ & [C_2^{IV}] \end{bmatrix} \begin{bmatrix} 1 & 0 & 0 & 1 \\ 0 & 0 & 1 & 0 \\ 0 & 0 & 0 & 1 \\ 0 & 1 & 0 & 0 \end{bmatrix} \quad (3)$$

$$[C_2^{III}] = [C_d^{II}]^T = \begin{bmatrix} \frac{1}{\sqrt{2}} & \frac{1}{\sqrt{2}} \\ \frac{1}{\sqrt{2}} & -\frac{1}{\sqrt{2}} \end{bmatrix} = \frac{1}{\sqrt{2}} \begin{bmatrix} 1 & 1 \\ 1 & -1 \end{bmatrix} C_r = \cos(r\pi)$$

-continued $$[\overline{C}_2^{IV}] = \begin{bmatrix} -\frac{C_1}{8} & \frac{C_9}{8} \\ \frac{C_9}{8} & \frac{C_1}{8} \end{bmatrix}$$

$$= \begin{bmatrix} 1 & 0 & -1 \\ 0 & 1 & 1 \end{bmatrix} \begin{bmatrix} -\frac{C_1+C_9}{8} & 0 & 0 \\ 0 & \frac{C_1+C_9}{8} & 0 \\ 0 & 0 & \frac{C_9}{8} \end{bmatrix} \begin{bmatrix} 1 & 0 \\ 0 & 1 \\ 1 & -1 \end{bmatrix}$$

FIG. 2 is a flowchart explaining how the Wang algorithm is applied in the field-mode, compression, inverse discrete-cosine transform apparatus. As can be understood from the flowchart, five multipliers 14a to 14e and nine adders 14f to 14n are used to achieve a compression inverse discrete-cosine transform at high speed.

The Wang algorithm is applied, decomposing the matrix [FS] into one expressed by the following equation (4). Note that the matrix [FS] is processed by the frame-mode, compression, inverse discrete-cosine transform apparatus.

$$[FS] = \tag{4}$$

$$\frac{1}{\sqrt{2}} \begin{bmatrix} 1 & 0 & 0 & 0 \\ 0 & 0 & 0 & 1 \\ 0 & 1 & 0 & 0 \\ 0 & 0 & 1 & 0 \end{bmatrix} \begin{bmatrix} 1 & 0 & 1 & 0 \\ 0 & 1 & 0 & 1 \\ 1 & 0 & -1 & 0 \\ 0 & 1 & 0 & -1 \end{bmatrix} \begin{bmatrix} [M_1] & \\ & [M_2] \end{bmatrix} \begin{bmatrix} 10000000 \\ 00100000 \\ 00001000 \\ 00000010 \\ 00010000 \\ 00000100 \\ 01000000 \\ 00000001 \end{bmatrix}$$

$$[M_1] = \begin{bmatrix} 1 & 1 \\ 1 & -1 \end{bmatrix} \begin{bmatrix} 1 & 0 & 0 & 0 \\ 0 & 1 & 1 & 1 \end{bmatrix} \begin{bmatrix} A & 0 & 0 & 0 \\ 0 & D & 0 & 0 \\ 0 & 0 & F & 0 \\ 0 & 0 & 0 & H \end{bmatrix}$$

$$[M_2] = \begin{bmatrix} 1 & 1 & 0 \\ 1 & 0 & 1 \end{bmatrix} \begin{bmatrix} -1 & 1 & 0 & 0 & 0 & 0 \\ 0 & 0 & 1 & 0 & 1 & 0 \\ 0 & 0 & 0 & 1 & 0 & 1 \end{bmatrix} \begin{bmatrix} E & 0 & 0 & 0 \\ 0 & G & 0 & 0 \\ 0 & 0 & B & 0 \\ 0 & 0 & C & 0 \\ 0 & 0 & 0 & I \\ 0 & 0 & 0 & J \end{bmatrix}$$

A to J in the equation (4) are as follows:

$$A = \frac{1}{\sqrt{2}} \quad F = \frac{\cos\frac{\pi}{8} - \cos\frac{3\pi}{8}}{4}$$

$$D = \frac{1}{4} \quad H = \frac{1}{4} + \frac{1}{2\sqrt{2}}$$

$$B = \frac{\cos\frac{\pi}{16} + \cos\frac{3\pi}{16} + 3\cos\frac{5\pi}{16} - \cos\frac{7\pi}{16}}{4}$$

$$C = \frac{\cos\frac{\pi}{16} - 3\cos\frac{3\pi}{16} - \cos\frac{5\pi}{16} - \cos\frac{7\pi}{16}}{4}$$

$$E = \frac{\cos\frac{\pi}{16} - \cos\frac{3\pi}{16} - \cos\frac{5\pi}{16} - \cos\frac{7\pi}{16}}{4}$$

$$G = \frac{\cos\frac{\pi}{16} - \cos\frac{3\pi}{16} + \cos\frac{5\pi}{16} + \cos\frac{7\pi}{16}}{4}$$

$$I = \frac{\cos\frac{\pi}{16} - \cos\frac{3\pi}{16} + 3\cos\frac{5\pi}{16} + \cos\frac{7\pi}{16}}{4}$$

$$J = \frac{\cos\frac{\pi}{16} + 3\cos\frac{3\pi}{16} - \cos\frac{5\pi}{16} + \cos\frac{7\pi}{16}}{4}$$

FIG. 3 is a flowchart explaining how the Wang algorithm is applied in the frame-mode, compression, inverse discrete-cosine transform apparatus. As seen from this flowchart, ten multipliers 15a to 15j and thirteen adders 15k to 15w are used to accomplish a compression inverse discrete-cosine transform at high speed.

Hitherto, the inverse discrete-cosine transform has been effected by three different methods. The first method performs inverse discrete-cosine transform on a high-resolution image or a standard-resolution image, either subjected to discrete-cosine transform, while maintaining the resolution of the image. (Hereinafter, the first method will be referred to as "standard inverse discrete-cosine transform.") The second method carries out inverse discrete-cosine transform on a high-resolution image subjected, converting the image to one having a reduced resolution. (Hereinafter, the second method will be called "compression, inverse discrete-cosine transform.") The third method effects field discrete-cosine transform on a discrete-cosine block subjected, thus dividing the block into fields. (Hereinafter, the third method will be referred to as "field-division, inverse discrete-cosine transform.") The inverse discrete-cosine transform apparatuses that perform these three methods, respectively, are dedicated hardware units.

Recently, image data is digitized. More and more apparatuses complying with the MPEG (Moving Picture Experts Group) system are used in broadcast stations and data-receiving sites such as households, for two reasons. First, the apparatuses perform orthogonal transformation and motion compensation on digital image data that has redundancy, thereby compressing the image data. Second, the image data can be transmitted and stored with higher efficiency than in the case it is not so compressed at all.

The image data that will be transmitted in digital broadcasting in increasing amounts contains both standard-resolution data and high-resolution data. The data-receiving apparatus that receives the image data needs to have an inverse discrete-cosine transform apparatus that can decode both the standard-resolution data and the high-resolution data.

To perform the above-mentioned different methods, however, a inverse discrete-cosine transform apparatus needs to have many multipliers and adders and will become complex, large and expensive. This is inevitably because the discrete-cosine blocks processed in the methods differ in size.

BRIEF SUMMARY OF THE INVENTION

The present invention has been made in consideration of the foregoing. An object of the invention is to provide an inverse discrete-cosine transform apparatus that has a simple structure and can, nonetheless, perform both standard inverse discrete-cosine transform and compression, inverse discrete-cosine transform and field-division, and/or inverse discrete-cosine transform.

To achieve the object, an inverse discrete-cosine transform apparatus according to the invention is designed to perform inverse discrete-cosine transform on a discrete-cosine block that is a matrix composed of at most 8×8 discrete-cosine coefficients. The apparatus comprises: eight discrete-cosine transform multipliers for multiplying the discrete-cosine coefficients input in the form of a bit stream, by coefficients; ten field, compression discrete-cosine transform multipliers for multiplying the discrete-cosine coefficients input in the form of a bit stream, by coefficients; eight selecting means for receiving the discrete-cosine coefficients multiplied by the coefficients in the eight discrete-cosine transform multipliers and the discrete-cosine coefficients multiplied by the coefficients in the ten field, compression discrete-cosine transform multipliers; control means for controlling the eight selecting means so that, when the discrete-cosine block is not subjected to field division, one of the values input from the eight discrete-cosine transform multipliers to the eight selecting means may be selected in accordance with the positions the discrete-cosine coefficients take in the discrete-cosine block and may then be output after a plus sign or a minus signal is added to the value selected, and when the discrete-cosine block is subjected to field division and the discrete-cosine coefficients are input in the from of a vertical bit stream, one of the values input from the ten field, compression discrete-cosine transform multipliers to the eight discrete-cosine transform multipliers may be in accordance with the positions the discrete-cosine coefficients take in the discrete-cosine block and may then be output after a plus sign or a minus signal is added to the value selected; and eight adding means associated with the eight selecting means, respectively, each for adding the values output from the associated selecting means. Each of the eight discrete-cosine transform multipliers has, as coefficient, any one of eight inverse discrete-cosine coefficients which are some of the elements of a first matrix applied to perform inverse discrete-cosine transform on the discrete-cosine block and which have absolute values not identical to those of any other elements of the first matrix. Each of the ten field, compression discrete-cosine transform multipliers has, as coefficient, any one of the ten inverse discrete-cosine coefficients which are some of the elements of a second matrix applied to perform field, compression discrete-cosine transform and which have absolute values not identical to those of any other elements of the second matrix.

The inverse discrete-cosine transform apparatus outputs discrete-cosine coefficients multiplied by inverse transform coefficients in the field-mode multiplier, when the input discrete-cosine block is not subjected to field division. The apparatus outputs discrete-cosine coefficients multiplied by inverse transform coefficients in the frame-mode multiplier, when a discrete-cosine block is input in the from of a vertical bit stream and then subjected to field division.

According to the invention, there is provided an inverse discrete-cosine transform apparatus that is designed to perform inverse discrete-cosine transform on a discrete-cosine block that is a matrix composed of at most 8×8 discrete-cosine coefficients. This apparatus comprises: eight multipliers for multiplying the discrete-cosine coefficients input in the form of a bit stream, by coefficients; eight selecting means for receiving the discrete-cosine coefficients multiplied by the coefficients in the eight discrete-cosine transform multipliers; control means for controlling the eight selecting means so that one of the values input from the eight discrete-cosine transform multipliers to the eight selecting means may be selected in accordance with the positions the discrete-cosine coefficients take in the discrete-cosine block and may then be output after a plus sign or a minus signal is added to the value selected; and eight adding means associated with the eight selecting means, respectively, each for adding the values output from the associated selecting means, In the apparatus, each of the eight multipliers has, as coefficient, any one of eight inverse discrete-cosine coefficients which are some of the elements of a matrix applied to perform inverse discrete-cosine transform on the discrete-cosine block and which have absolute values not identical to those of any other elements of the first matrix.

This inverse discrete-cosine transform apparatus effects inverse discrete-cosine transform on a discrete-cosine block that is a matrix composed of at most 8×8 elements.

As can be understood from the foregoing, an inverse discrete-cosine transform apparatus according to the invention has a simple structure. It needs only eight inverse discrete-cosine transform multipliers and only ten field, compression discrete-cosine transform multipliers. This is because standard inverse discrete-cosine transform, compression, inverse discrete-cosine transform, and field, compression, inverse discrete-cosine transform are effected on the inverse transform coefficients of a matrix, thereby extracting the inverse transform coefficients that overlap the others of the matrix in terms of absolute value. The apparatus further comprises eight selecting means, control means and eight adding means. Therefore, it can perform standard inverse discrete-cosine transform, maintaining the resolution of a high- or standard-resolution image subjected to discrete-cosine transform. The apparatus can also effect compression, inverse discrete-cosine transform, converting a high-resolution image subjected to discrete-cosine transform, to a standard-resolution image. Further, the apparatus can execute field, compression, inverse discrete-cosine transform, dividing a discrete-cosine block subjected to field, discrete-cosine transform, into fields, thereby achieving compressed, discrete-cosine transform.

As seen from the foregoing, another inverse discrete-cosine transform apparatus according to the invention has a simple structure. It needs only eight multipliers. This is because standard inverse discrete-cosine transform and compression, inverse discrete-cosine transform are effected on the inverse transform coefficients of a matrix, thereby extracting the inverse transform coefficients that overlap the others of the matrix in terms of absolute value. The apparatus further comprises eight selecting means, control means and eight adding means. Therefore, it can perform standard inverse discrete-cosine transform, maintaining the resolution of a high- or standard-resolution image subjected to discrete-cosine transform. The apparatus can also effect compression, inverse discrete-cosine transform, converting a high-resolution image subjected to discrete-cosine transform, to a standard-resolution image.

BRIEF DESCRIPTION OF THE SEVERAL VIEWS OF THE DRAWING

FIG. 8A is a diagram explaining how the inverse discrete-cosine transform apparatus of FIG. 6 processes data in the fourth mode; and FIG. 8B is a diagram explaining how the inverse discrete-cosine transform apparatus illustrated in FIG. 4 processes data in the fifth mode.

DETAILED DESCRIPTION OF THE INVENTION

Inverse discrete-cosine transform apparatuses, which are embodiments of this invention, will be described with reference to the accompanying drawings.

Figure 4:
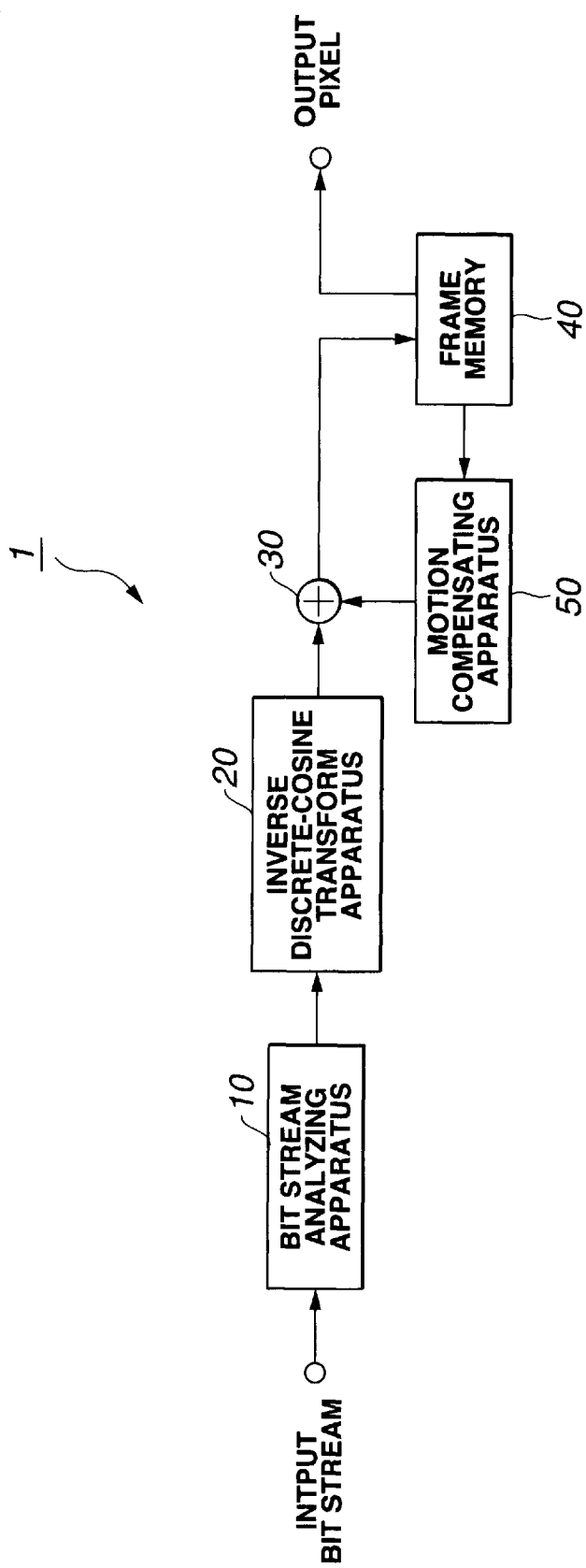
FIG. 4 is a block diagram showing an image decoding apparatus incorporating an inverse discrete-cosine transform apparatus that is the first embodiment of this invention.

FIG. 4 illustrates an image decoding system 1 that incorporates the first embodiment of the invention.

The image decoding 1 is an MPEG-2 (Moving Picture Experts Group phase-2) system. The MPEG-2 system is an image-data compressing system that can compress not only an interlaced-scan image and a sequential-scan image, but also a standard-resolution image and a high-resolution image.

As shown in FIG. 4, the image decoding system 1 comprises a bit stream analyzing apparatus 10, an inverse discrete-cosine transform apparatus 20, an adder apparatus 30, a frame memory 40, and a motion compensating apparatus 50.

The bit stream analyzing apparatus 10 receives a bit stream, or the discrete-cosine coefficients that compose a discrete-cosine block. The apparatus 10 extracts data from the bit stream in accordance with the syntax defined by MPEG-2. The data thus extracted (hereinafter called "analyzed data") is will be used in the process described later. The analyzed data is supplied to the inverse discrete-cosine transform apparatus 20. The analyzed data shows, for example, whether the input coefficients have been generated by means of discrete-cosine transform effected in the field mode or the frame mode.

The inverse discrete-cosine transform apparatus 20 performs inverse discrete-cosine transform on the bit stream supplied from the bit stream analyzing apparatus 10. The bit stream subjected to this transform is supplied, as pixel data, to the adder apparatus 30.

The adder apparatus 30 receives reference image data that has been motion-compensated, as well as the pixel data supplied from the discrete-cosine transform apparatus 20. The adder apparatus 30 adds the reference image and the pixel data, generating new reference image data. The new reference image data is supplied to the frame memory 40.

The frame memory 40 stores the new reference image data for some time. The frame memory 40 then supplies the new reference image data to the motion compensating apparatus 50.

The motion compensating apparatus 50 receives the reference image data supplied from the frame memory 40 and effects motion compensation on this image data at, for example, ½-precision. The reference image data, thus motion-compensated, is supplied to the adder apparatus 30.

The inverse discrete-cosine transform apparatus 20 is designed to perform inverse discrete-cosine transform in three different modes, which will be described below.

In the first mode, the inverse discrete-cosine transform apparatus 20 receives a discrete-cosine block representing a high- or standard-resolution image and generates image data of the same resolution.

In the second mode, the inverse discrete-cosine transform apparatus 20 receives a discrete-cosine block representing a high-resolution image and generates image data of standard resolution. In the second mode the apparatus 20 extracts higher components of the input data in the horizontal direction.

In the third mode, the inverse discrete-cosine transform apparatus 20 receives an interlaced-scan image data of high resolution. If the interlaced-scan image data has been subjected to discrete-cosine transform in field mode or frame mode, the apparatus 20 will generate image data of a lower resolution.

Figure 5A:
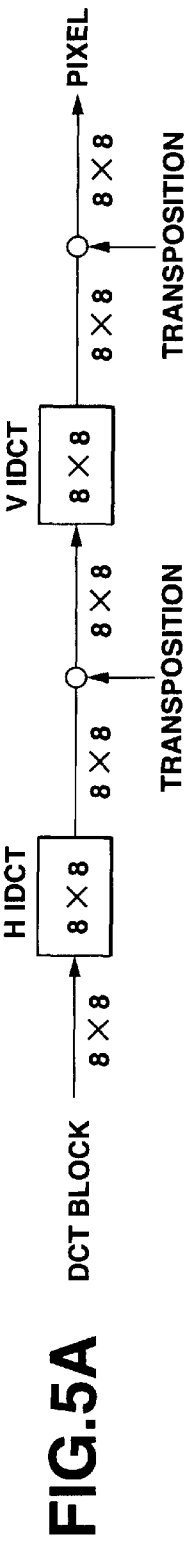
FIG. 5A is a diagram explaining how the inverse discrete-cosine transform apparatus shown in FIG. 4 processes data in the first mode.

More specifically, in the first mode, the inverse discrete-cosine transform apparatus 20 receives an 8×8 discrete-cosine block as shown in FIG. 5A. This block has been generated by performing discrete-cosine transform on 8×8 image data. The apparatus 20 effects matrix calculus on an inverse discrete-cosine block composed of 8×8 inverse transform coefficients, thus achieving inverse discrete-cosine transform in the horizontal direction (HIDCT 8×8). An 8×8 matrix is thereby obtained. The apparatus 20 then transposes the 8×8 matrix and carries out matrix calculus on the inverse discrete-cosine block again, effecting inverse discrete-cosine transform in the vertical direction (VIDC 8×8). Furthermore, the apparatus 20 transposes the resultant 8×8 matrix, generating 8×8 pixel data.

Figure 5B:
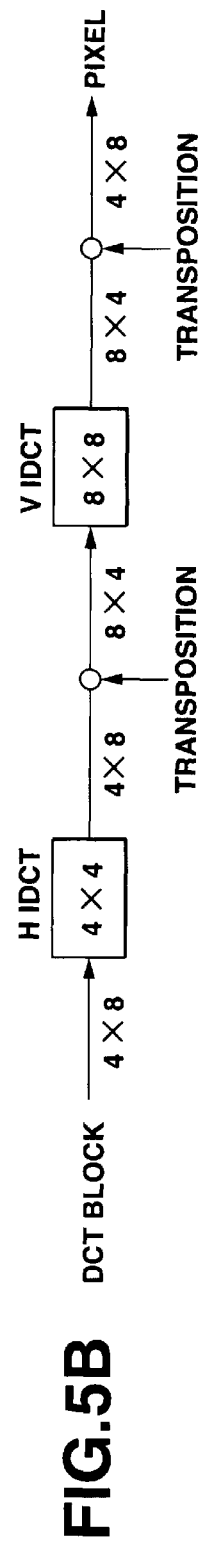
FIG. 5B is a diagram illustrating how the inverse discrete-cosine transform apparatus depicted in FIG. 4 processes data in the second mode.

In the second mode, the inverse discrete-cosine transform apparatus 20 receives a 4×8 discrete-cosine block as shown in FIG. 5B. This 4×8 block has been generated by first performing discrete-cosine transform on 8×8 image data, thus generating an 8×8 discrete-cosine block, and then extracting the high-frequency components of the 8×8 block, in the horizontal direction. The apparatus 20 effects matrix calculus on an inverse discrete-cosine block composed of 4×4 inverse transform coefficients, accomplishing inverse discrete-cosine transform in the horizontal direction (HIDCT 4×4). A 4×8 matrix is thereby generated. The apparatus 20 then transposes the 4×8 matrix and performs matrix calculus on an 8×8 inverse discrete-cosine block, effecting inverse discrete-cosine transform in the vertical direction (VIDCT 8×8). Moreover, the apparatus 20 transposes the resultant 8×4 matrix, generating 4×8 pixel data.

In the third mode, the inverse discrete-cosine transform apparatus 20 carries out discrete-cosine transform in two modes, i.e., field discrete-cosine transform mode and frame discrete-cosine transform mode.

In the field discrete-cosine transform mode, the apparatus 20 receives a 4×4 discrete-cosine block input in the form of a bit stream. The 4×4 discrete-cosine block has been generated by effecting discrete-cosine transform on 8×8 image data, thus extracting some discrete-cosine coefficients from the block in both the vertical direction and the horizontal direction. The apparatus 20 executes matrix calculus on the 4×4 discrete-cosine block and a 4×4 inverse discrete-cosine block, achieving inverse discrete-cosine transform in the horizontal direction (HIDCT 4×4). The apparatus 20 then transposes the resultant 4×4 matrix and performs matrix calculus on the 4×4 inverse discrete-cosine block again, thereby accomplishing inverse discrete-cosine transform in the vertical direction (VIDCT 4×4). Thereafter, the apparatus 20 transposes the 4×4 matrix, generating 4×4 pixel data by means of compression, inverse discrete-cosine transform.

In the frame discrete-cosine transform mode, the apparatus 20 receives an 8×4 discrete-cosine block input in the form of a bit stream. The 8×4 discrete-cosine block has been generated by effecting discrete-cosine transform on 8×8 image data, thus extracting some discrete-cosine coefficients from the block in the vertical direction only. The apparatus 20 executes matrix calculus on the 8×4 discrete-cosine block and a 4×4 inverse discrete-cosine block, achieving inverse discrete-cosine transform in the horizontal direction (HIDCT 4×4). The apparatus then transposes the resultant 8×4 matrix and performs matrix calculus on the 8×4 and dividing the matrix into fields in the vertical direction. Thereafter, the apparatus 20 transposes the 8×4 inverse discrete-cosine block (FSVIDCT 8×4). Moreover, the apparatus 20 transposes the resultant 4×4 matrix, generating 4×4 pixel data by means of compression, inverse discrete-cosine transform.

Figure 6:
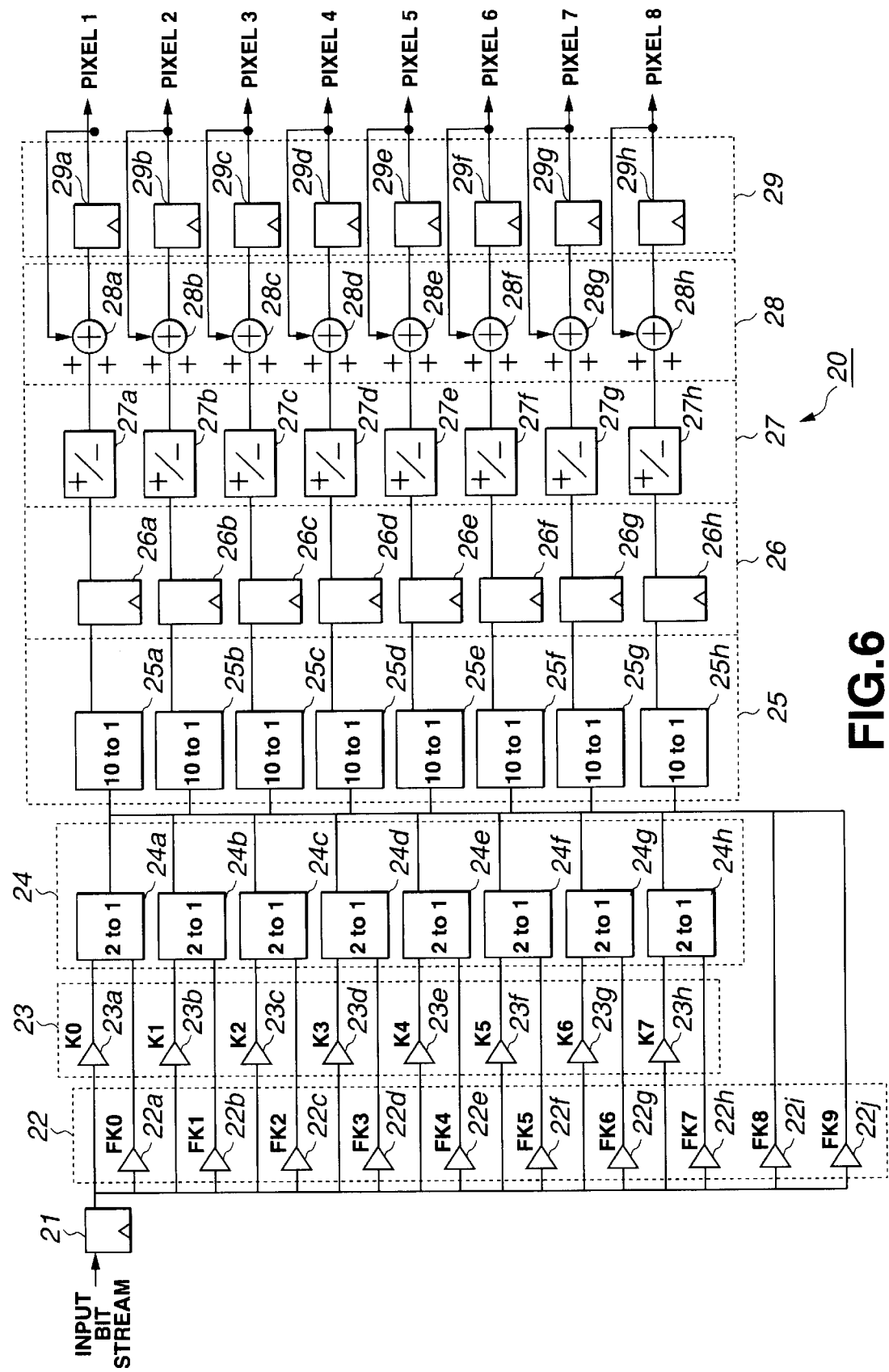
FIG. 6 is a circuit diagram of the inverse discrete-cosine transform apparatus shown in FIG. 4.

FIG. 6 shows the circuit configuration of the inverse discrete-cosine transform apparatus 20 that is the first embodiment of the present invention.

As FIG. 6 shows, the apparatus 20 comprises three buffer sections 21, 26 and 29, an FK multiplying section 22, a K multiplying section 23, two selector sections 24 and 25, a sign multiplying section 27, and an adding section 28.

The buffer section 21 receives a bit stream from the bit stream analyzing apparatus 10, in units of discrete-cosine blocks each composed of discrete-cosine coefficients. The buffer section 21 stores the discrete-cosine blocks for some time and supplies them to the FK multiplying section 22.

The FK multiplying section 22 comprises ten multipliers 22a, 22b, 22c, 22d, 22e, 22f, 22g, 22h, 22i and 22j, each having a fixed coefficient. That is, inverse transform coefficients FK0, FK1, FK2, FK3, FK4, FK5, FK6, FK7, FK8 and FK9 have been supplied to the multipliers 22a to 22j, respectively. The FK multiplying section 22 multiplies the discrete-cosine coefficients input in the form of a bit stream, by the inverse transform coefficients FK0 to FK9, and outputs the products to the selector section 24.

Table 1 presented below shows the values of the inverse transform coefficients FK0 to FK9. The coefficient FK0 to FK9 will be described.

transform apparatus, has 8×4 elements. Of these elements, only ten elements A to J can be extracted in terms of their absolute values. If elements A to J are multiplied first by 1/√2 and then by 8192, inverse transform coefficients FK0 to FK9 will be obtained. Each of the coefficients FK0 to FK9 consists of 14 bits (−8192 to 8192), as is shown in Table 1.

Figure 1:
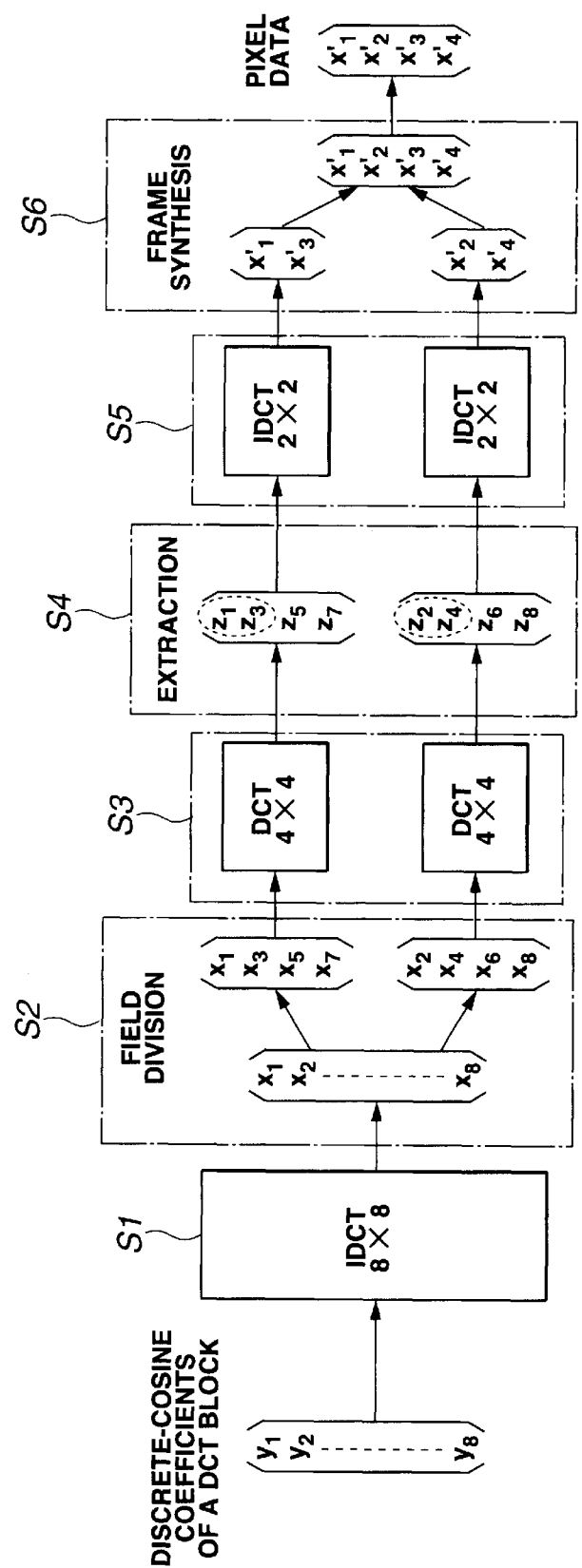
FIG. 1 is a diagram explaining how a frame-mode, compression, inverse discrete-cosine transform apparatus performs its function.
Figure 2:
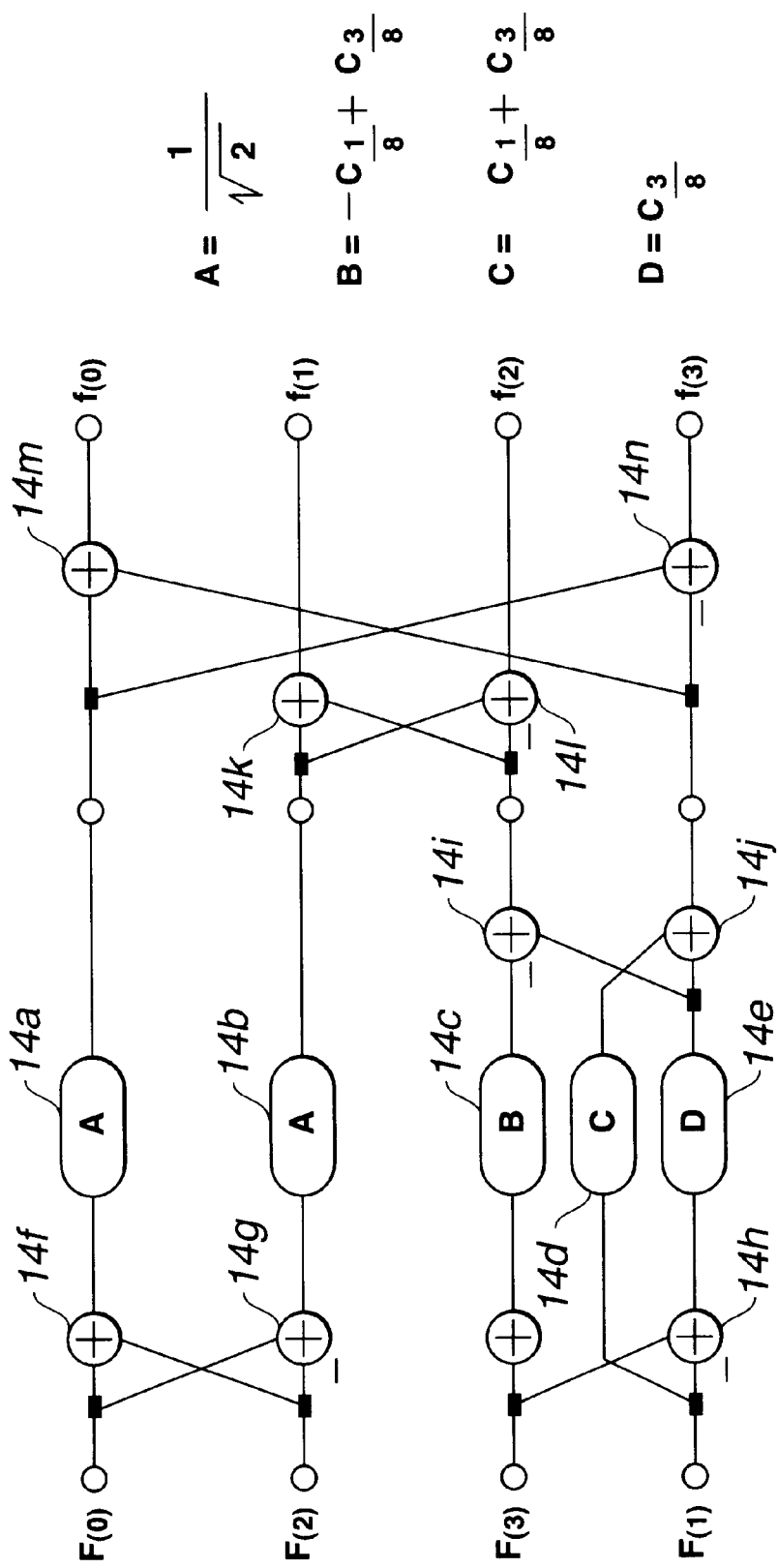
FIG. 2 is a flowchart illustrating how the transform apparatus of FIG. 1 operates when the Wang algorithm is applied to the apparatus.
Figure 3:
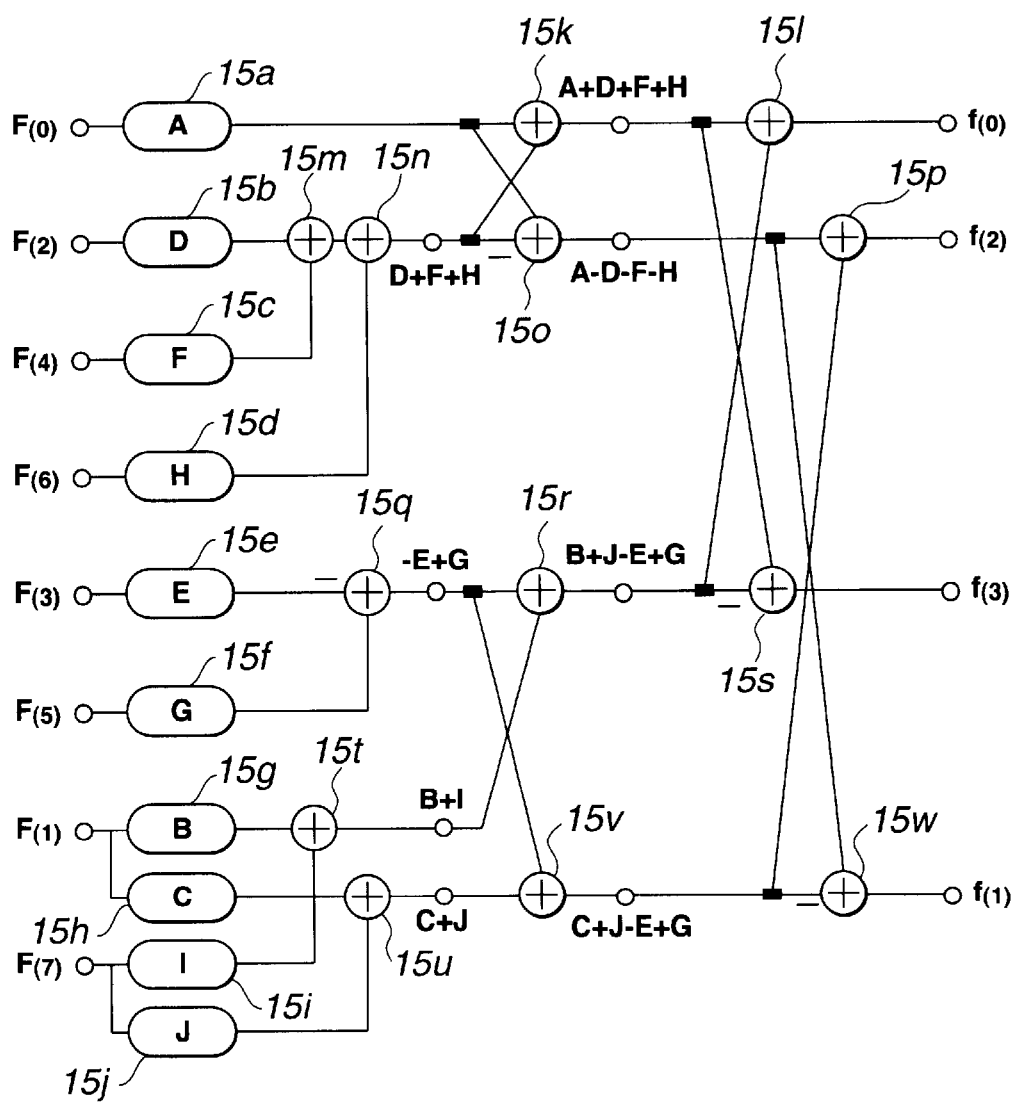
FIG. 3 is a flowchart explaining how a field-mode, compression, inverse discrete-cosine transform apparatus operates when the Wang algorithm is applied to it.

Hence, the number of multipliers, which the FK multiplying section 22 of the inverse discrete-cosine transform apparatus 20 needs to have, can be reduced from 8×4 (i.e., the number of the elements of matrix [FS]) to ten. Namely, the FK multiplying section 22 needs to have only as many multipliers as the multipliers 15a to 15j shown in the flowchart of FIG. 3 that explains how the conventional transform apparatus operates when fast algorithm is applied to it.

As shown in FIG. 6, the K multiplying section 23 comprises eight multipliers 23a, 23b, 23c, 23d, 23e, 23f, 23g and 23h, each having a fixed coefficient. More correctly, inverse transform coefficients K0, K1, K2, K3, K4, K5, K6 and K7 have been supplied to the multipliers 23a to 23h, respectively. The K multiplying section 23 multiplies the discrete-cosine coefficients input in the form of a bit stream, by the inverse transform coefficients K0 to K7, and outputs the products to the selector section 24.

Table 2 presented below shows the values of the inverse transform coefficients K0 to K7. The coefficient K0 to K7 will be described.

TABLE 2

| No. | K0 | K1 | K2 | K3 | K4 | K5 | K6 | K7 |
|---|---|---|---|---|---|---|---|---|
| Coeff: | 5793 | 5681 | 5352 | 4816 | 4096 | 3218 | 2217 | 1130 |

The step of effecting inverse discrete-cosine transform on discrete-cosine coefficients, without carrying out field division, can be replaced by the matrix calculus performed on matrix [NFS] that is obtained from the equation (1) and represented by the following equation (5).

$$[NFS] = \frac{1}{\sqrt{2}} \begin{bmatrix} K & L & M & N & O & P & Q & R \\ K & N & Q & -R & -O & -L & -M & -P \\ K & P & -Q & -L & -O & R & M & N \\ K & R & -M & -P & O & N & -Q & -L \\ K & -R & -M & P & O & -N & -Q & L \\ K & -P & -Q & L & -O & -R & M & -N \\ K & -N & Q & R & -O & L & -M & P \\ K & -L & M & -N & O & -P & Q & -R \end{bmatrix} \quad (5)$$

TABLE 1

| No. | FK0 | FK1 | FK2 | FK3 | FK4 | FK5 | FK6 | FK7 | FK8 | FK9 |
|---|---|---|---|---|---|---|---|---|---|---|
| Coeff: | 4096 | 4756 | 3279 | 1448 | 871 | 1567 | 1303 | 3496 | 2912 | 4511 |

The elements K to R in the equation (5) have the values specified below:

$$K = \frac{1}{\sqrt{2}}$$

$$L = \cos\frac{\pi}{16}$$

$$M = \cos\frac{\pi}{8}$$

$$N = \cos\frac{3}{16}\pi$$

$$O = \frac{1}{\sqrt{2}}$$

$$P = \cos\frac{5}{16}\pi$$

$$Q = \cos\frac{3}{8}\pi$$

$$R = \cos\frac{7}{16}\pi$$

The matrix [NFS] shown in the equation (5) has 8×8 elements. Of these elements, only eight elements K to R can be extracted in terms of their absolute values. If elements K to R are multiplied first by $1/\sqrt{2}$ and then 8192, inverse transfer coefficients K0 to K7 will be obtained. Each of the coefficients K0 to K7 consists of 14 bits (−8192 to 8192), as is shown in Table 2. Thus, the number of multipliers, which the multiplying section 23 of the inverse discrete-cosine transform apparatus 20 requires, can be reduced from 8×8 (i.e., the number of the elements of matrix [NFS]) to eight.

The matrix [NFS] is utilized to effectuate HIDCT 8×8 and VIDCT 8×8, which are shown in FIGS. 5A and 5B. In the inverse discrete-cosine transform apparatus 20, the selector section 24 selects the products the multiplying section 23 has output by multiplying discrete-cosine coefficients by the inverse transform coefficients K0 to K7.

Figure 5C:
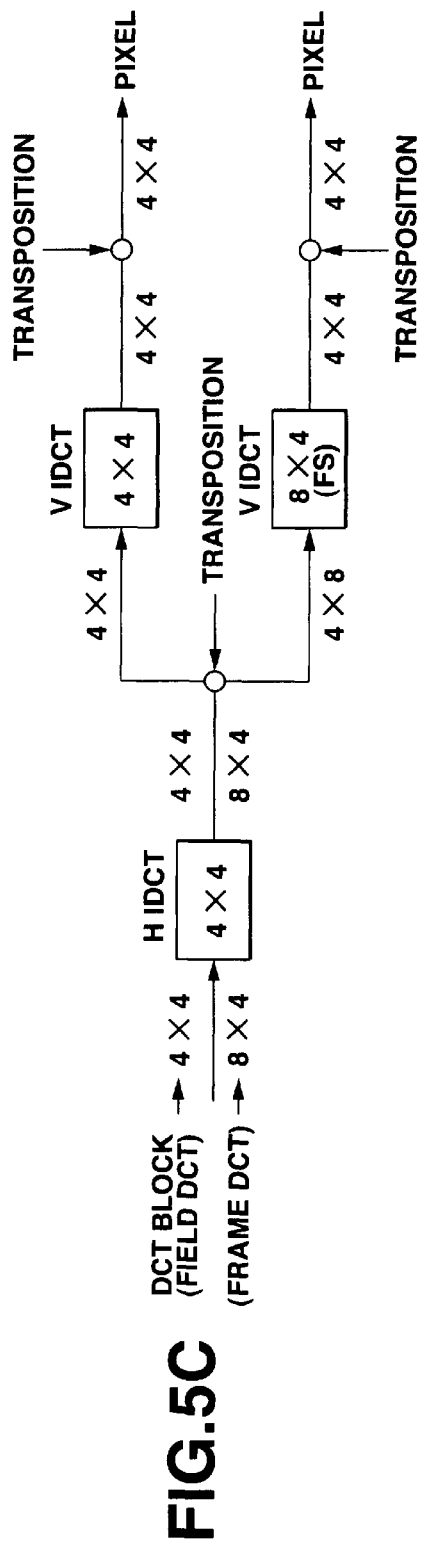
FIG. 5C is a diagram explaining how the inverse discrete-cosine transform apparatus illustrated in FIG. 4 processes data in the third mode.

The step of achieving HIDCT 4×4 shown in FIG. 5B and the step of effecting VIDCT 4×4 shown in FIG. 5C can be replaced by the matrix calculus effected on the following matrix [NFS'] derived from the equation (5) and on the discrete-cosine coefficients.

$$[NFS'] = \frac{1}{\sqrt{2}}\begin{bmatrix} K & M & O & Q \\ K & Q & -O & -M \\ K & -Q & -O & M \\ K & -M & O & -Q \end{bmatrix} \quad (6)$$

Therefore, it suffices for the apparatus 20 to use only the coefficients K0, K2, K4 and K6, i.e., four of the eight inverse transform coefficients shown in Table 2, in order to accomplish the inverse discrete-cosine transform. The four inverse transform coefficients, which are used, are shaded in the following Table 3.

TABLE 3

| No.    | K0   | K1   | K2   | K3   | K4   | K5   | K6   | K7   |
|--------|------|------|------|------|------|------|------|------|
| Coeff: | 5793 | 5681 | 5352 | 4816 | 4096 | 3218 | 2217 | 1130 |

The selector section 24 comprises eight selectors 24a, 24b, 24c, 24d, 24e, 24f, 24g and 24h. The selector section 24 selects the discrete-cosine coefficients multiplied by inverse transform coefficients FK0 to FK9 or the discrete-cosine coefficients multiplied by inverse transform coefficients K0 to K7, in accordance with the data output from the bit stream analyzing apparatus 10. The section 24 selects one of these two sets of discrete-cosine coefficients, under the control of the control section (not shown) provided in the inverse discrete-cosine transform apparatus 20.

More specifically, the bit stream analyzing apparatus 10 analyzes the bit stream input to the image decoding system 1 to determine whether the bit stream extends in the vertical direction of the discrete-cosine coefficients that have been generated by processing an interlaced-scan image in the frame discrete-cosine transform mode. If the bit stream is found to extend so, the bit stream analyzing apparatus 10 supplies data showing this fact, to the control section (not shown) provided in the inverse discrete-cosine transform apparatus 20. In accordance with this data, the control section controls the selector section 24, causing the section 24 to select the discrete-cosine coefficients multiplied by inverse transform coefficients FK0 to FK9. The discrete-cosine coefficients, thus selected, are output from the selector section.

The bit stream analyzing apparatus 10 may determine that the bit stream input to the image decoding system 1 is composed of discrete-cosine coefficients generated by processing an interlaced-scan image in the field discrete-cosine transform mode or discrete-cosine coefficients generated by processing a progressive image. In this case, the bit stream analyzing apparatus 10 supplies data showing this fact, to the control section (not shown) provided in the inverse discrete-cosine transform apparatus 20. In accordance with the data, the control section controls the selector section 24, causing the section 24 to select the discrete-cosine coefficients multiplied by inverse transform coefficients K0 to K7. These discrete-cosine coefficients selected are output from the selector section.

The selector section 25 comprises eight selectors 25a, 25b, 25c, 25d, 25e, 25f, 25g and 25h. The selectors 25a to 25h selects values from those shown in the following Tables 4 and 5, under the control of the control section (not shown). It should be noted that Tables 4 and 5 are stored in the memory section (not shown) that is provided in the inverse discrete-cosine transform apparatus 20.

TABLE 4

| Index | C0 | U1 | U2 | U3 | U4 | U5 | U6 | U7 |
|-------|----|----|----|----|----|----|----|----|
| V0    | 0  | 1  | 3  | 4  | 5  | 6  | 7  | 8  |
| V1    | 0  | 2  | 3  | 4  | 5  | 6  | 7  | 9  |
| V2    | 0  | 2  | 3  | 4  | 5  | 6  | 7  | 9  |
| V3    | 0  | 1  | 3  | 4  | 5  | 6  | 7  | 8  |

TABLE 5

| Index | U0 | U1 | U2 | U3 | U4 | U5 | U6 | U7 |
|-------|----|----|----|----|----|----|----|----|
| V0    | 0  | 1  | 2  | 3  | 4  | 5  | 6  | 7  |
| V1    | 0  | 3  | 6  | 7  | 4  | 1  | 2  | 5  |
| V2    | 0  | 5  | 6  | 1  | 4  | 7  | 2  | 3  |
| V3    | 0  | 7  | 2  | 5  | 4  | 3  | 6  | 1  |
| V4    | 0  | 7  | 2  | 5  | 4  | 3  | 6  | 1  |
| V5    | 0  | 5  | 6  | 1  | 4  | 7  | 2  | 3  |
| V6    | 0  | 3  | 6  | 7  | 4  | 1  | 2  | 5  |
| V7    | 0  | 1  | 2  | 3  | 4  | 5  | 6  | 7  |

The selector section 25 selects values from the Tables 4 and 5 so that the discrete-cosine coefficients multiplied by inverse transform coefficients may be added in the adding section 28 in accordance with the rules of matrix calculus performed on the matrix [FS] or [NFS] and the discrete-cosine coefficients.

As indicated above, the selector section 24 outputs one of two sets of values in accordance with whether the discrete-cosine coefficients, input in the form of a bit stream, should be subjected to field division. That is, the section 24 selects and outputs the values multiplied by the inverse transform coefficients FK0 to FK9 or the value multiplied by inverse transform coefficients K0 to K7. Note that the values multiplied by the inverse transform coefficients FK0 to FK9 are the absolute values the elements of the matrix [FS] have. On the other hand, the values multiplied by inverse transform coefficients K0 to K7 are the absolute values the elements of the matrix [NFS] have.

The values the elements of the matrix [NFS'] have are those selected from Table 5, as is shaded in the following Table 6.

TABLE 6

| Index | U0 | U1 | U2 | U3 | U4 | U5 | U6 | U7 |
|---|---|---|---|---|---|---|---|---|
| V0 | 0 | 1 | 2 | 3 | 4 | 5 | 6 | 7 |
| V1 | 0 | 3 | 6 | 7 | 4 | 1 | 2 | 5 |
| V2 | 0 | 5 | 6 | 1 | 4 | 7 | 2 | 3 |
| V3 | 0 | 7 | 2 | 5 | 4 | 3 | 6 | 1 |
| V4 | 0 | 7 | 2 | 5 | 4 | 3 | 6 | 1 |
| V5 | 0 | 5 | 6 | 1 | 4 | 7 | 2 | 3 |
| V6 | 0 | 3 | 6 | 7 | 4 | 1 | 2 | 5 |
| V7 | 0 | 1 | 2 | 3 | 4 | 5 | 6 | 7 |

Thus, what should be stored in the memory section (not shown) are Tables 4 and 5. The method in which the selector section 25 selects values from Tables 4, 5 and 6 in accordance with the rules of matrix calculus will be described later in detail.

The buffer section 26 comprises eight buffers 26a, 26b, 26c, 26d, 26e, 26f, 26g and 26h. The buffers 26a to 26h receive the values output from the selector section 25 and store them for some time. The buffers 26a to 26h output the values at the same time when they receive a sync signal.

The values may be input from the selectors 25a to 25h of the selector section 25 to the buffers 26a to 26h at different times. Nonetheless, the buffers 26a to 26h hold the values until a sync signal is supplied to them. Upon receipt of the sync signal, the buffers 26a to 26h output the value simultaneously.

The sign multiplying section 27 comprises eight sign multipliers 27a, 27b, 27c, 27d, 27e, 27f, 27g and 27h. The sign multipliers 27a to 27h receive values from the buffers 26a to 26h, respectively. Each sign multiplier multiplies the input value by a plus sign or a minus sign in accordance with the following Tables 7 and 8 that are stored in the memory section (not shown). As a result of this, all elements of the matrices [FS] and [NFS] have their absolute values in the process of generating the inverse transform coefficients FK0 to FK9 and the inverse transform coefficients K0 to K7.

TABLE 7

| Index | U0 | U1 | U2 | U3 | U4 | U5 | U6 | U7 |
|---|---|---|---|---|---|---|---|---|
| V0 | 1 | 1 | 1 | −1 | 1 | 1 | 1 | 1 |
| V1 | 1 | −1 | −1 | 1 | −1 | −1 | −1 | −1 |
| V2 | 1 | 1 | −1 | −1 | −1 | 1 | −1 | 1 |
| V3 | 1 | −1 | 1 | 1 | 1 | −1 | 1 | −1 |

TABLE 8

| Index | U0 | U1 | U2 | U3 | U4 | U5 | U6 | U7 |
|---|---|---|---|---|---|---|---|---|
| V0 | 1 | 1 | 1 | 1 | 1 | 1 | 1 | 1 |
| V1 | 1 | 1 | 1 | −1 | −1 | −1 | −1 | −1 |
| V2 | 1 | 1 | −1 | −1 | −1 | 1 | 1 | 1 |
| V3 | 1 | 1 | −1 | −1 | 1 | 1 | −1 | −1 |
| V4 | 1 | −1 | −1 | 1 | 1 | −1 | −1 | 1 |
| V5 | 1 | −1 | −1 | 1 | −1 | −1 | 1 | −1 |
| V6 | 1 | −1 | 1 | 1 | −1 | 1 | −1 | 1 |
| V7 | 1 | −1 | 1 | −1 | 1 | −1 | 1 | −1 |

The following table 9 corresponds to the matrix [NFS']. The elements of the matrix [NFS'], which are shaded in Table 9, have been extracted from Table 8.

TABLE 9

| Index | U0 | U1 | U2 | U3 | U4 | U5 | U6 | U7 |
|---|---|---|---|---|---|---|---|---|
| V0 | 1 | 1 | 1 | 1 | 1 | 1 | 1 | 1 |
| V1 | 1 | 1 | 1 | −1 | −1 | −1 | −1 | −1 |
| V2 | 1 | 1 | −1 | −1 | −1 | 1 | 1 | 1 |
| V3 | 1 | 1 | −1 | −1 | 1 | 1 | −1 | −1 |
| V4 | 1 | −1 | −1 | 1 | 1 | −1 | −1 | 1 |
| V5 | 1 | −1 | −1 | 1 | −1 | −1 | 1 | −1 |
| V6 | 1 | −1 | 1 | 1 | −1 | 1 | −1 | 1 |
| V7 | 1 | −1 | 1 | −1 | 1 | −1 | 1 | −1 |

Hence, what are stored in the memory section (not shown) are Table 7 and Table 8. Each value output from the buffer section 26 is multiplied by the plus sign or the minus signal in accordance with the rules of matrix calculus using Tables 7, 8 and 9 as will be described later in detail.

The adding section 28 comprises eight adders 28a, 28b, 28c, 28d, 28e, 28f, 28g and 28h. The section 28 adds the values output from the sign multiplying section 27 to the values output from the buffer section 29, which will be described later. The adding section 28 performs addition after the elements of each row are multiplied by the elements of one column during the matrix calculus effected on the discrete-cosine coefficients, matrix [FS], matrix [NFS] and matrix [NFS'].

The buffer section 29 comprises eight buffers 29a, 29b, 29c, 29d, 29e, 29f, 29g and 29h. The section 29 receives the values output from the adding section 28 and stores them for some time. The section 29 feeds the values back to the adding section 28, which adds these values to the values output from the sign multiplying section 27. The buffer section 29 outputs the input values as pixel data when the adding section 28 outputs the sum of the discrete-cosine coefficients for one row, which have been multiplied by inverse transform coefficients.

How the inverse discrete-cosine transform apparatus 20 operates in the first mode will be described.

First, the apparatus 20 performs inverse discrete-cosine transform in the horizontal direction. Assume that the apparatus 20 receives the discrete-cosine coefficients of, for example, the 8×8 discrete-cosine block (7) shown below. Note that these discrete-cosine coefficients are input to the apparatus 20, as a bit stream that extends in thee horizontal direction and starts with a DC component.

$$\begin{bmatrix} D_{00} & D_{01} & D_{02} & D_{03} & D_{04} & D_{05} & D_{06} & D_{07} \\ D_{10} & D_{11} & D_{12} & D_{13} & D_{14} & D_{15} & D_{16} & D_{17} \\ D_{20} & D_{21} & D_{22} & D_{23} & D_{24} & D_{25} & D_{26} & D_{27} \\ D_{30} & D_{31} & D_{32} & D_{33} & D_{34} & D_{35} & D_{36} & D_{37} \\ D_{40} & D_{41} & D_{42} & D_{43} & D_{44} & D_{45} & D_{46} & D_{47} \\ D_{50} & D_{51} & D_{52} & D_{53} & D_{54} & D_{55} & D_{56} & D_{57} \\ D_{60} & D_{61} & D_{62} & D_{63} & D_{64} & D_{65} & D_{66} & D_{67} \\ D_{70} & D_{71} & D_{72} & D_{73} & D_{74} & D_{75} & D_{76} & D_{77} \end{bmatrix} \quad (7)$$

The two-figure suffix to each discrete-cosine coefficient indicates the ordinal numbers of the row and column in which the coefficient exists. It should be noted that the suffix "0" designates the first row and the first column. Thus, coefficient $D_{25}$ exists in the second row and the fifth column. The direction, in which the row number increases, for example form $D_{00}$ to $D_{70}$, shall be called "row direction." The direction, in which the column number increases, for example form $D_{00}$ to $D_{07}$, shall be called "column direction."

The discrete-cosine coefficient $D_{00}$, i.e., the first coefficient input to the apparatus 20, is temporarily stored in the buffer section 21. Then, the coefficient $D_{00}$ is supplied to the FK multiplying section 22. The section 22 multiplies the coefficient $D_{00}$ by inverse transform coefficients FK0 to FK9. Further, the K multiplying section 23 multiplies the discrete-cosine coefficient $D_{00}$ by inverse transform coefficients K0 to K7. The selector section 24 selects the coefficient $D_{00}$ that has been multiplied by the inverse transform coefficients K0 to K7. The Table the selector section 25 uses is Table 5.

Consider the selector 25a provided in the selector section 25. The control section (not shown) controls the selector 25a in accordance with Table 5. That is, the control section causes the selector 25a to select one of the eight values K0·$D_{00}$, K1·$D_{00}$, K2·$D_{00}$, K3·$D_{00}$, K4·$D_{00}$, K5·$D_{00}$, K6·$D_{00}$ and K7·$D_{00}$, that have been output from the selectors 24a to 24h, respectively. The selector 25a outputs the value it has selected. Ordinal numbers 0 to 7 are assigned to the eight values output from the selectors 24a to 24h, respectively.

In Table 5, indices V0 to V7 are arranged in the vertical direction, and indices U0 to U7 are arranged in the horizontal direction. The indices V0 to V7 correspond to the selectors 25a to 25h, respectively. The indices U0 to U7 correspond to the ordinal numbers of the columns shown in the discrete-cosine block (7). As for the selector 25a, the index V0 intersects with index U0, i.e., the column number of the input discrete-cosine coefficient $D_{00}$, at the value of 0. The value 0 means numbers 0 to 7 allocated to the output values of the selectors 24a to 24h. The value the selector 25a outputs is therefore K0·$D_{00}$ that has been output from the selector 24a.

As for the selectors 25b to 25h, the index V0 intersects with the index U0 at the value of 0 when the discrete-cosine coefficient $D_{00}$ is input, as can been seen from Table 5. Therefore, the control section causes the selectors 25b to 25h to select and output the value K0·$D_{00}$.

The value K0·$D_{00}$ output from the selector section 25 is input to the buffer section 26. The buffer section 26 outputs this value to the sign multiplying section 27 when it receives a sync signal.

The control section causes the sign multiplying section 27 to multiply the value by the plus sign or the minus sign in accordance with Table 8. The indices V0 to V7 in the vertical direction correspond to the sign multipliers 27a to 27h as is shown in Table 8. On the other hand, the indices U0 to U7 in the horizontal direction correspond to the column numbers shown in the discrete-cosine block (7), in the same way as is indicated in Table 5. The values shown in Table 8 are signs by which the values input to that the sign multiplying section 27 will be multiplied.

How the sign multiplier 27a, for example, operates will be explained. Under the control of the control section, the sign multiplier 27a multiplies the input value K0·$D_{00}$ by the plus sign, +1. The resultant value, K0·$D_{00}$, is output to the adder 28a of the addition section 28. At this time, the buffer 29a stores nothing at all. The adder 28a therefore adds 0 to K0·$D_{00}$. Hence, value K0·$D_{00}$ is output to buffer 29a and stored therein.

Similarly, the values output from the selectors 25b to 25h are multiplied by the plus sign or the minus sign in the sign multipliers 27b to 27h, respectively. The values obtained in the sign multipliers 27b to 27h are stored in the buffers 29b to 29h.

Assume that the value $D_{01}$ included in the discrete-cosine block (7) is input to the buffer section 21. In this case, the FK multiplying section 22 and K multiplying section 23 multiply the value $D_{01}$ by two inverse transform coefficients and the selector section 24 selects the value $D_{01}$ multiplied by inverse transform coefficients K0 to K7.

The control section causes the selectors 25a to 25h to select and output values, in accordance with Table 5. Hence, the selector 25a selects value 1 and therefore outputs the value supplied from the selector 24a. The selector 25b selects value 3 and thus outputs the value supplied from the selector 24d. The selector 25c selects value 5 and, hence, outputs the value supplied from the selector 24f. The selector 25d selects value 7 and therefore outputs the value supplied from the selector 24h. The selector 25e selects value 7 and, hence, outputs the value supplied from the selector 24h. The selector 25f selects value 5 and thus outputs the value supplied from the selector 24f. The selector 25g selects value 3 and therefore outputs the value supplied from the selector 24d. And the selector 25h selects value 1 and, hence, outputs the value supplied from the selector 24a.

The sign multipliers 27a to 27h receive the values K1·$D_{01}$, K3·$D_{01}$, K5·$D_{01}$, K7·$D_{01}$, K7·$D_{01}$, K5·$D_{01}$, K3·$D_{01}$, K1·$D_{01}$, respectively, which have been output from the buffers 26a to 26h. The sign multipliers 27a to 27h multiply these input values by +1, +1, +1, +1, −1, −1, −1 and −1, respectively. The products of the multiplication are output to the adding section 28.

The adding section 28 receives the values from the sign multiplying section 27 and adds them to the values stored in the buffer section 29. For example, the adder 28a receives the value K1·$D_{01}$ output from the sign multiplier 27a and adds the value K1·$D_{01}$ to the value K0·$D_{00}$ stored in the buffer 29a. The resultant sum, K0·$D_{00}$+K1·$D_{01}$ is supplied from the adder 28a to the buffer 29a. The buffer 29a stores the sum K0·$D_{00}$+K1·$D_{01}$. The other adders 28b to 28h effectuate similar addition, and the sums obtained are stored into the buffers 29b to 29h. Thus, the values stored in the buffers 29b to 29h are updated.

When values $D_{02}$, $D_{03}$, $D_{04}$, $D_{05}$, $D_{06}$ and $D_{07}$, contained in the discrete-cosine block (7), are input to the buffer section 21, the apparatus 20 performs inverse discrete-cosine transform in the same manner as described above.

Thus, the inverse discrete-cosine transform apparatus 20 processes the discrete-cosine transform coefficients $D_{01}$ to $D_{07}$ in the horizontal direction, which are included in the discrete-cosine block (7), generating eight pixel data items for one column. The pixel data items are output from the buffer section 29 of the apparatus 20. The horizontal pixel data P, thus generated by means of horizontal inverse discrete-cosine transform, can be expressed by the matrix shown below. As seen from the matrix (8), horizontal pixel data items $P_{01}, P_{02}, P_{03}, P_{04}, P_{05}, P_{06}$ and $P_{07}$ are generated by processing discrete-cosine transform coefficients $D_{01}$ to $D_{07}$ of the discrete-cosine block (7) input in the horizontal direction to the inverse discrete-cosine transform apparatus 20.

$$\begin{bmatrix} P_{00} & P_{01} & P_{02} & P_{03} & P_{04} & P_{05} & P_{06} & P_{07} \\ P_{10} & P_{11} & P_{12} & P_{13} & P_{14} & P_{15} & P_{16} & P_{17} \\ P_{20} & P_{21} & P_{22} & P_{23} & P_{24} & P_{25} & P_{26} & P_{27} \\ P_{30} & P_{31} & P_{32} & P_{33} & P_{34} & P_{35} & P_{36} & P_{37} \\ P_{40} & P_{41} & P_{42} & P_{43} & P_{44} & P_{45} & P_{46} & P_{47} \\ P_{50} & P_{51} & P_{52} & P_{53} & P_{54} & P_{55} & P_{56} & P_{57} \\ P_{60} & P_{61} & P_{62} & P_{63} & P_{64} & P_{65} & P_{66} & P_{67} \\ P_{70} & P_{71} & P_{72} & P_{73} & P_{74} & P_{75} & P_{76} & P_{77} \end{bmatrix} \quad (8)$$

Thus, the apparatus 20 outputs horizontal pixel data for one column, which has been generated from a bit stream, or the discrete-cosine coefficients that compose the discrete-cosine block (7). After receiving the last discrete-cosine coefficient $D_{77}$ of the block (7) and outputting the matrix (8), the inverse discrete-cosine transform apparatus starts performing inverse discrete-cosine transform in the vertical direction.

In this case, the matrix (8) may be input to the inverse discrete-cosine transform apparatus 20. To perform the inverse discrete-cosine transform on the matrix (8) at higher speeds, however, use is made of two inverse discrete-cosine transform apparatuses identical to the apparatus 20, which are connected in series.

The elements $P_{00}, P_{10}, P_{20}$, and so on, of the matrix (8) are input to the apparatus 20 in the order mentioned, or in the vertical direction. That is, the rows and column of the matrix (8) are transposed, forming a new matrix, and matrix calculus is carried out on the new matrix and the forming a matrix [NFS].

The functional sections of the inverse discrete-cosine transform apparatus 20 process the matrices in the vertical direction, just in the same way as they perform the inverse discrete-cosine transform in the horizontal direction. Therefore, it will not be described in detail how the apparatus 20 processes the matrices in the vertical direction.

Assume that the following pixel data S, or the following matrix (9), which is composed of pixel data items $S_{00}$ to $S_{70}$, is generated. Then, the elements $P_{00}, P_{10}, P_{20}, \ldots, P_{70}$ of the matrix (9), which form the first column of the matrix (9), are input to the buffer section 21. In this case, the buffers 29a to 29h output the first-column pixel data items $P_{00}, P_{10}, P_{20}, \ldots, P_{70}$.

$$\begin{bmatrix} S_{00} & S_{01} & S_{02} & S_{03} & S_{04} & S_{05} & S_{06} & S_{07} \\ S_{10} & S_{11} & S_{12} & S_{13} & S_{14} & S_{15} & S_{16} & S_{17} \\ S_{20} & S_{21} & S_{22} & S_{23} & S_{24} & S_{25} & S_{26} & S_{27} \\ S_{30} & S_{31} & S_{32} & S_{33} & S_{34} & S_{35} & S_{36} & S_{37} \\ S_{40} & S_{41} & S_{42} & S_{43} & S_{44} & S_{45} & S_{46} & S_{47} \\ S_{50} & S_{51} & S_{52} & S_{53} & S_{54} & S_{55} & S_{56} & S_{57} \\ S_{60} & S_{61} & S_{62} & S_{63} & S_{64} & S_{65} & S_{66} & S_{67} \\ S_{70} & S_{71} & S_{72} & S_{73} & S_{74} & S_{75} & S_{76} & S_{77} \end{bmatrix} \quad (9)$$

The matrix calculus performed on the matrix [NFS] and the matrix obtained by transposing the matrix (8) results in a matrix that the matrix (9) transposed. Therefore, the matrix resulting from this matrix calculus is identical to the results provided by the inverse discrete-cosine transform apparatus 20.

It will be now described how the inverse discrete-cosine transform apparatus 20 operates in the second mode. At first, the apparatus 20 performs inverse discrete-cosine transform in the horizontal direction. In the second mode, the apparatus 20 receives the discrete-cosine coefficients of, for example, 4×8 discrete-cosine coefficients, $D_{00} \ldots D_{03}$, $D_{10} \ldots D_{13}, D_{20} \ldots D_{23}, D_{30} \ldots D_{33}, D_{40} \ldots D_{43}, D_{50} \ldots D_{53}, D_{60} \ldots D_{63}, D_{70} \ldots D_{73}$, which are included in the 8×8 discrete-cosine block (7). Note that these discrete-cosine coefficients are input to the apparatus 20, as a bit stream that extends in the horizontal direction and starts with a DC component. The selector section 24 (i.e., selectors 24a to 24h) selects the products the K multiplying section 23 generates by multiplying the input values by the inverse transform coefficient shown in Table 2. The selector section 25 (i.e., selectors 25a to 25d) selects the values shaded in Table 6. The sign multiplying section 27 (i.e., sign multipliers 27a to 27d) processes the values shaded in Table 9 in the same way as in the first mode. In the inverse discrete-cosine transform effected in the second mode, the buffer section 29 (i.e., buffers 29a to 29d) outputs a 4×8 horizontal pixel block.

Next, inverse discrete-cosine transform is executed in the vertical direction. As indicated above, the 4×8 horizontal pixel block is input to the inverse discrete-cosine transform apparatus 20 in the form of a bit stream that extends in the vertical direction. The selector section 24 (i.e., selectors 24a to 24h) selects the values output from the K multiplier section 23 that has multiplied the inverse transform coefficients shown in Table 2. The selector 25 (i.e., selectors 25a to 25h) uses Table 5. The sign multiplying section 27 (i.e., sign multipliers 27a to 27h) uses Table 8, effecting the same process as in the first mode. Thus, the buffer section 29 (i.e., buffers 29a to 29h) outputs 4×8 pixel data items as the inverse discrete-cosine transform is carried out in the second mode.

How the inverse discrete-cosine transform apparatus 20 operates in the third mode will be now described.

In the third mode, the apparatus 20 operates in one way when it receives field discrete-cosine transform coefficients and in another when it receives frame discrete-cosine transform coefficients. In the first case, the apparatus 20 effects so-called "field, compression, inverse transform" on the transform coefficients input to it. In the second case, the apparatus 20 carries out so-called "frame, compression, inverse transform" on the input transform coefficients.

Assume that the inverse discrete-cosine transform apparatus 20 receives discrete-cosine coefficients subjected to field discrete-cosine transform.

In this case, the inverse discrete-cosine transform is first executed in the horizontal direction. In the third mode, the apparatus 20 receives, for example, 4×4 discrete-cosine coefficients $D_{00}$, $D_{01}$, $D_{02}$, $D_{03}$, $D_{10}$, $D_{11}$, $D_{12}$, $D_{13}$, $D_{20}$, $D_{21}$, $D_{22}$, $D_{23}$, $D_{30}$, $D_{31}$, $D_{32}$, and $D_{33}$, which are included in the 8×8 discrete-cosine block (7). Note that these discrete-cosine coefficients are input to the apparatus 20, as a bit stream that extends in the horizontal direction and starts with a DC component. The selector section 24 (i.e., selectors 24a to 24h) selects the products the K multiplying section 23 generates by multiplying the input values by the inverse transform coefficient shown in Table 3. The selector section 25 (i.e., selectors 25a to 25d) selects the values shaded in Table 6. The sign multiplying section 27 (i.e., sign multipliers 27a to 27d) processes the values shaded in Table 9 in the same way as in the first mode. In the field, compression, inverse transform effected in the third mode, the buffer section 29 (i.e., buffers 29a to 29d) outputs a 4×4 horizontal pixel block.

Next, the apparatus 20 effectuates inverse discrete-cosine transform in the vertical direction. The 4×4 horizontal pixel block, which has been obtained as indicated above, is input to the inverse discrete-cosine transform apparatus 20 in the form of a bit stream that extends in the vertical direction. The selector section 24 (i.e., selectors 24a to 24h) selects the values output from the K multiplier section 23 that has multiplied the inverse transform coefficients shown in Table 3. The selector 25 (i.e., selectors 25a to 25d) uses the values shaded in Table 6. The sign multiplying section 27 (i.e., sign multipliers 27a to 27d) uses the values shaded in Table 9, effecting the same process as in the first mode. Thus, the buffer section 29 (i.e., buffers 29a to 29d) outputs 4×4 pixel data items as the field, compression, inverse transform is carried out in the third mode.

It will be described how the inverse discrete-cosine transform apparatus 20 operates when it receives the discrete-cosine coefficients subjected to frame discrete-cosine transform.

First, the apparatus 20 effects inverse discrete-cosine transform in the horizontal direction. In the third mode, the apparatus 20 receives, for example, 8×4 discrete-cosine coefficients $D_{00}$, $D_{01}$, . . . $D_{07}$, $D_{10}$, $D_{11}$, . . . $D_{17}$, $D_{20}$, $D_{21}$, . . . $D_{27}$, $D_{30}$, $D_{31}$, . . . and $D_{37}$, which are included in the 8×8 discrete-cosine block (7) that has been subjected to frame, discrete-cosine transform. Note that these 8×4 discrete-cosine coefficients are input to the apparatus 20, as a bit stream that extends in the horizontal direction and starts with a DC component. The selector section 24 (i.e., selectors 24a to 24h) selects the products the K multiplying section 23 generates by multiplying the input values by the inverse transform coefficient shown in Table 3. The selector section 25 (i.e., selectors 25a to 25d) selects the values shaded in Table 6. The sign multiplying section 27 (i.e., sign multipliers 27a to 27d) processes the values shaded in Table 9 in the same way as in the first mode. In the frame, compression, inverse transform effected in the third mode, the buffer section 29 (i.e., buffers 29a to 29d) outputs a 4×8 horizontal pixel block.

Next, the apparatus 20 executes inverse discrete-cosine transform in the vertical direction. The 4×8 horizontal pixel block, which has been obtained as described above, is input to the inverse discrete-cosine transform apparatus 20 in the form of a bit stream that extends in the vertical direction. The selector section 24 (i.e., selectors 24a to 24h) selects the values output from the multiplier section 22 that has multiplied the inverse transform coefficients shown in Table 1. The selector 25 (i.e., selectors 25a to 25d) uses the values shown in Table 4. The sign multiplying section 27 (i.e., sign multipliers 27a to 27d) uses the values shown in Table 7, effecting the same process as in the first mode. As a result, the buffer section 29 (i.e., buffers 29a to 29d) outputs 4×4 pixel data items as the frame, compression, inverse transform is performed in the third mode.

Thus, in the inverse discrete-cosine transform apparatus 20, the FK multiplying section 22 multiplies the discrete-cosine coefficients by the inverse transform coefficients, the absolute values of which are applied when the field division is carried out. Further, the K multiplying section 23 multiplies the discrete-cosine coefficients by the inverse transform coefficients, the absolute values of which are applied when the field division is not performed. The selector section 25 is controlled to output values that may be added in the adding section 28 in accordance with the rules of matrix calculus. The sign multiplying section 27 multiplies the absolute values of inverse transform coefficients by the minus sign. The adding section 28 adds the outputs of the sign multiplying section 27 to the values output from the buffer section 29. Therefore, the apparatus 20 can perform inverse discrete-cosine transform in three modes, utilizing the same hardware. This simplifies the circuit configuration of the inverse discrete-cosine transform apparatus 20.

Figure 7:
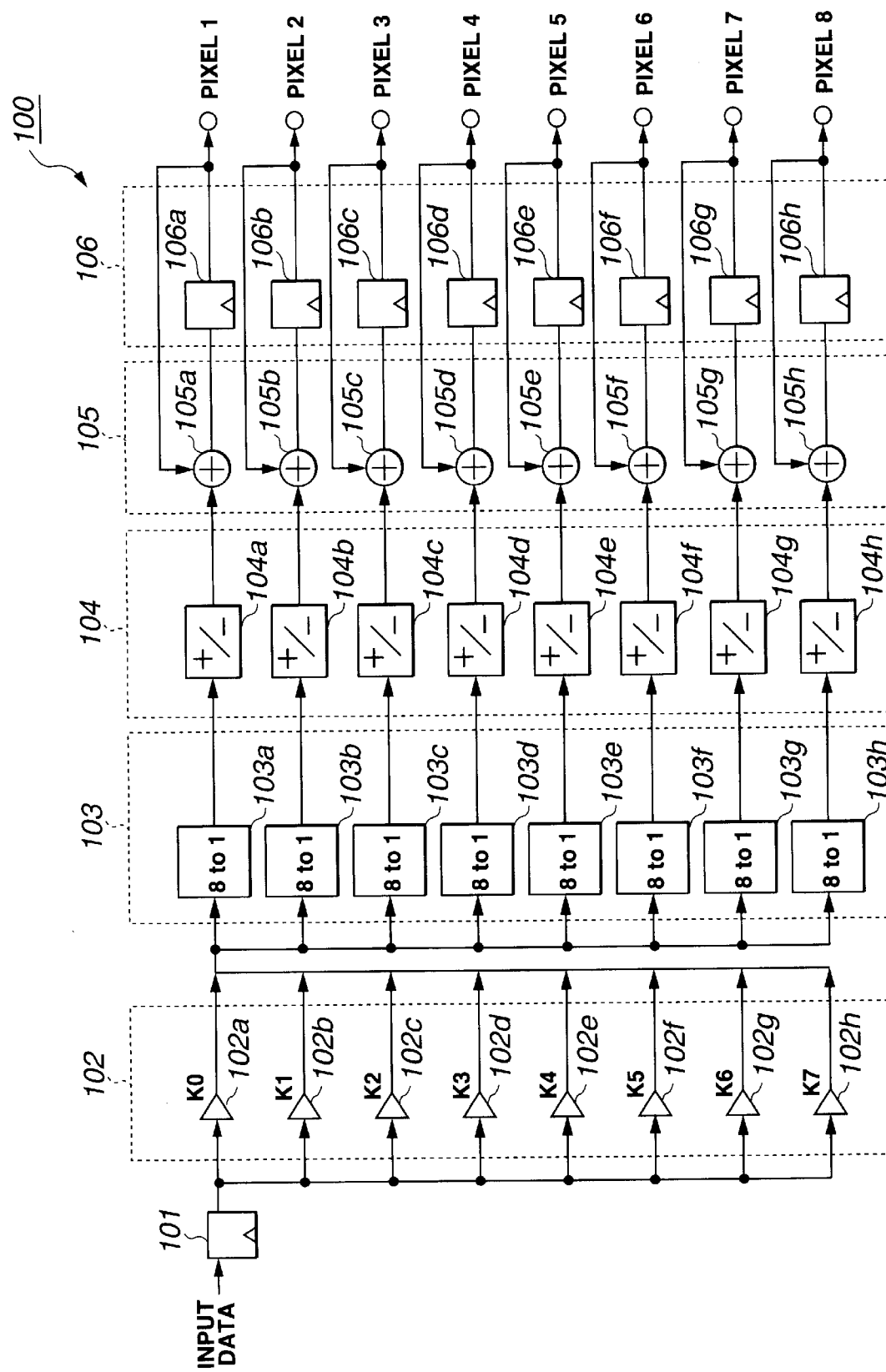
FIG. 7 is a circuit diagram of an inverse discrete-cosine transform apparatus that is the second embodiment of the present invention.

FIG. 7 illustrates the circuit configuration of an inverse discrete-cosine transform apparatus 100, which is the second embodiment of the present invention.

The inverse discrete-cosine transform apparatus 100 may be incorporated into the image decoding system 1 shown in FIG. 4, in place of the inverse discrete-cosine transform apparatus 20 that has been described with reference to FIG. 4. If the system 1 incorporates the apparatus 100, the other components of the system 1 operate in the same manner.

Like the inverse discrete-cosine transform apparatus 20, the apparatus 100 receives a bit stream from the bit stream analyzing apparatus 10, performs inverse discrete-cosine transform on the bit stream, thereby generating pixel data, and supplies the pixel data to the adder apparatus 30.

As mentioned above, the inverse discrete-cosine transform apparatus 20 can effect inverse discrete-cosine transform in the first, second and third modes. By contrast, the inverse discrete-cosine transform apparatus 100 can perform inverse discrete-cosine transform in two different modes, i.e., the fourth mode and the fifth mode.

In the fourth mode, the inverse discrete-cosine transform apparatus 100 receives a discrete-cosine block representing a high- or standard-resolution image and generates image data of the same resolution.

More specifically, in the fourth mode, the inverse discrete-cosine transform apparatus 100 receives an 8×8 discrete-cosine block as shown in FIG. 8A, just as the apparatus 20 does in the first mode. Note that the block has been generated by performing discrete-cosine transform on 8×8 image data. The apparatus 100 effects matrix calculus on an inverse discrete-cosine block composed of 8×8 inverse transform coefficients, thus achieving inverse discrete-cosine transform in the horizontal direction (HIDCT 8×8). An 8×8 matrix is thereby obtained. The apparatus 100 then transposes the 8×8 matrix and effects matrix calculus on the inverse discrete-cosine block again, effectuating inverse discrete-cosine transform in the vertical direction (VIDCT 8×8). Further, the apparatus 100 transposes the resultant 8×8 matrix, generating 8×8 pixel data.

In the fifth mode, the inverse discrete-cosine transform apparatus 100 receives a discrete-cosine block representing a high-resolution image and generates image data of a lower resolution. In other words, the apparatus 100 extracts the higher component in the vertical direction and the components in the horizontal direction from the discrete-cosine block, thereby to output image data of a lower resolution.

More precisely, in the fifth mode, the apparatus 100 receives a 4×4 discrete-cosine block input in the form of a bit stream as is illustrated in FIG. 8B. The 4×4 discrete-cosine block has been generated by effecting discrete-cosine transform on 8×8 image data, thus extracting some discrete-cosine coefficients from the block in both the vertical direction and the horizontal direction. The apparatus 100 executes matrix calculus on the 4×4 discrete-cosine block and a 4×4 inverse discrete-cosine block, achieving inverse discrete-cosine transform in the horizontal direction (HIDCT 4×4), generating a 4×4 matrix. The apparatus 100 then transposes the 4×4 matrix and performs matrix calculus on the 4×4 inverse discrete-cosine block again, thereby accomplishing inverse discrete-cosine transform in the vertical direction (VIDCT 4×4), thereby generating a 4×4 matrix. Thereafter, the apparatus 100 transposes this 4×4 matrix, generating 4×4 pixel data.

The circuit configuration of the inverse discrete-cosine transform apparatus 100 will be described, with reference to FIG. 7.

As shown in FIG. 7, the apparatus 100 comprises a buffer section 101, a multiplying section 102, a selector section 103, a sign multiplying section 104, an adding section 105, and a buffer section 106.

The buffer section 101 performs the same function as the buffer section 21 of the inverse discrete-cosine transform apparatus 20. The buffer section 101 receives a bit stream from the bit stream analyzing apparatus 10, in units of discrete-cosine blocks each composed of discrete-cosine coefficients. The buffer section 101 stores the discrete-cosine blocks for some time and supplies them to the multiplying section 102.

The multiplying section 102 comprises eight multipliers 102a, 102b, 102c, 102d, 102e, 102f, 102g and 102h, each having a fixed coefficient. That is, inverse transform coefficients K0, K1, K2, K3, K4, K5, K6 and K7 have been supplied to the multipliers 102a to 102h, respectively. The multiplying section 102 multiplies the discrete-cosine coefficients input in the form of a bit stream, by the inverse transform coefficients K0 to K7, and outputs the products to the selector section 103.

The step of effecting inverse discrete-cosine transform on discrete-cosine coefficients can be replaced by the matrix calculus performed on matrix [NFS] that is obtained from the equation (1) and represented by the following equation (5).

$$[NFS] = \frac{1}{\sqrt{2}} \begin{bmatrix} K & L & M & N & O & P & Q & R \\ K & N & Q & -R & -O & -L & -M & -P \\ K & P & -Q & -L & -O & R & M & N \\ K & R & -M & -P & O & N & -Q & -L \\ K & -R & -M & P & O & -N & -Q & L \\ K & -P & -Q & L & -O & -R & M & -N \\ K & -N & Q & R & -O & L & -M & P \\ K & -L & M & -N & O & -P & Q & -R \end{bmatrix} \quad (5)$$

As indicated above, the matrix [NFS] has 8×8 elements. Of these elements, only eight elements K to R can be extracted in terms of their absolute values. The number of multipliers required in the multiplying section 103, therefore, be reduced from 8×8 (the number of elements the matrix [NFS] has) to eight. If the elements K to R are multiplied first by $1/\sqrt{2}$ and then by 8192, inverse transform coefficients K0 to K7 will be obtained. Each of the coefficients K0 to K7 consists of 14 bits (−8192 to 8192). These coefficients K0 to K7 may be allocated to the multipliers of the multiplying section 103, as is shown in the following Table 10.

TABLE 10

| No. | K0 | K1 | K2 | K3 | K4 | K5 | K6 | K7 |
|---|---|---|---|---|---|---|---|---|
| Coeff: | 5793 | 5681 | 5352 | 4816 | 4096 | 3218 | 2217 | 1130 |

The matrix [NFS] is utilized to effectuate HIDCT 8×8 and VIDCT 8×8, which are shown in FIG. 8A.

The step of achieving HIDCT 4×4 and VIDCT 4×4, shown in FIG. 8B, can be replaced by the matrix calculus effected on the matrix [NFS'] (equation (6)) derived from the equation (5) and on the discrete-cosine coefficients.

Therefore, it suffices for the apparatus 100 to use only the coefficients K0, K2, K4 and K6, i.e., four of the eight inverse transform coefficients shown in Table 10, in order to accomplish the inverse discrete-cosine transform. The four inverse transform coefficients, which are used, are shaded in the following Table 11.

TABLE 11

| No. | K0 | K1 | K2 | K3 | K4 | K5 | K6 | K7 |
|---|---|---|---|---|---|---|---|---|
| Coeff: | 5793 | 5681 | 5352 | 4816 | 4096 | 3218 | 2217 | 1130 |

The selector section 103 comprises eight selectors 103a, 103b, 103c, 103d, 103e, 103f, 103g and 103h. Each selector selects a value in accordance with the following Table 12, under the control of the control section (not shown) provided in the inverse discrete-cosine transform apparatus 100.

TABLE 12

| Index | U0 | U1 | U2 | U3 | U4 | U5 | U6 | U7 |
|---|---|---|---|---|---|---|---|---|
| V0 | 0 | 1 | 2 | 3 | 4 | 5 | 6 | 7 |
| V1 | 0 | 3 | 6 | 7 | 4 | 1 | 2 | 5 |
| V2 | 0 | 5 | 6 | 1 | 4 | 7 | 2 | 3 |
| V3 | 0 | 7 | 2 | 5 | 4 | 3 | 6 | 1 |
| V4 | 0 | 7 | 2 | 5 | 4 | 3 | 6 | 1 |
| V5 | 0 | 5 | 6 | 1 | 4 | 7 | 2 | 3 |
| V6 | 0 | 3 | 6 | 7 | 4 | 1 | 2 | 5 |
| V7 | 0 | 1 | 2 | 3 | 4 | 5 | 6 | 7 |

The selector section 103 selects values from the Table 12 so that the discrete-cosine coefficients multiplied by inverse transform coefficients may be added in the adding section 105 (later described) in accordance with the rules of matrix calculus that is performed on the matrix [NFS] and the discrete-cosine coefficients.

The values the elements of the matrix [NFS'] have are those selected from Table 12, as is shaded in the following Table 13.

TABLE 13

| Index | U0 | U1 | U2 | U3 | U4 | U5 | U6 | U7 |
|---|---|---|---|---|---|---|---|---|
| V0 | 0 | 1 | 2 | 3 | 4 | 5 | 6 | 7 |
| V1 | 0 | 3 | 6 | 7 | 4 | 1 | 2 | 5 |

TABLE 13-continued

| Index | U0 | U1 | U2 | U3 | U4 | U5 | U6 | U7 |
|---|---|---|---|---|---|---|---|---|
| V2 | 0 | 5 | 6 | 1 | 4 | 7 | 2 | 3 |
| V3 | 0 | 7 | 2 | 5 | 4 | 3 | 6 | 1 |
| V4 | 0 | 7 | 2 | 5 | 4 | 3 | 6 | 1 |
| V5 | 0 | 5 | 6 | 1 | 4 | 7 | 2 | 3 |
| V6 | 0 | 3 | 6 | 7 | 4 | 1 | 2 | 5 |
| V7 | 0 | 1 | 2 | 3 | 4 | 5 | 6 | 7 |

The sign multiplying section 104 comprises eight sign multipliers 104a, 104b, 104c, 104d, 104e, 104f, 104g and 104h. The sign multiplying section 104 receives values from the selector 103. The section 104 multiplies the input value by a plus sign or a minus sign in accordance with the following Table 14 that is stored in the memory section (not shown). It should be noted that the elements of the matrix [NFS] have their absolute values in the process of generating the inverse transform coefficients K0 to K7.

TABLE 14

| Index | U0 | U1 | U2 | U3 | U4 | U5 | U6 | U7 |
|---|---|---|---|---|---|---|---|---|
| V0 | 1 | 1 | 1 | 1 | 1 | 1 | 1 | 1 |
| V1 | 1 | 1 | 1 | −1 | −1 | −1 | −1 | −1 |
| V2 | 1 | 1 | −1 | −1 | −1 | 1 | 1 | 1 |
| V3 | 1 | 1 | −1 | −1 | 1 | 1 | −1 | −1 |
| V4 | 1 | −1 | −1 | 1 | 1 | −1 | −1 | 1 |
| V5 | 1 | −1 | −1 | 1 | −1 | −1 | 1 | −1 |
| V6 | 1 | −1 | 1 | 1 | −1 | 1 | −1 | 1 |
| V7 | 1 | −1 | 1 | −1 | 1 | −1 | 1 | −1 |

The following Table 15 corresponds to the matrix [NFS']. The elements of the matrix [NFS'], which are shaded in Table 14, have been extracted from Table 14.

TABLE 15

| Index | U0 | U1 | U2 | U3 | U4 | U5 | U6 | U7 |
|---|---|---|---|---|---|---|---|---|
| V0 | 1 | 1 | 1 | 1 | 1 | 1 | 1 | 1 |
| V1 | 1 | 1 | 1 | −1 | −1 | −1 | −1 | −1 |
| V2 | 1 | 1 | −1 | −1 | −1 | 1 | 1 | 1 |
| V3 | 1 | 1 | −1 | −1 | 1 | 1 | −1 | −1 |
| V4 | 1 | −1 | −1 | 1 | 1 | −1 | −1 | 1 |
| V5 | 1 | −1 | −1 | 1 | −1 | −1 | 1 | −1 |
| V6 | 1 | −1 | 1 | 1 | −1 | 1 | −1 | 1 |
| V7 | 1 | −1 | 1 | −1 | 1 | −1 | 1 | −1 |

The adding section 105 comprises eight adders 105a, 105b, 105c, 105d, 105e, 105f, 105g and 105h. The section 105 adds the values output from the sign multiplying section 104 to the values output from the buffer section 106, which will be described later. The adding section 105 performs addition after the elements of each row are multiplied by the elements of one column during the matrix calculus effected on the discrete-cosine coefficients, matrix [FS], matrix [NFS] and matrix [NFS'].

The buffer section 106 comprises eight buffers 106a, 106b, 106c, 106d, 106e, 106f, 106g and 106h. The section 106 receives the values output from the adding section 105 and stores them for some time. The section 106 feeds the values back to the adding section 105, which adds these values to the values output from the sign multiplying section 104. The buffer section 106 outputs the input values as pixel data when the adding section 105 outputs the sum of the discrete-cosine coefficients for one row, which have been multiplied by inverse transform coefficients.

How the inverse discrete-cosine transform apparatus 100 operates in the fourth mode will be described.

The fourth mode is identical to the first mode in which the inverse discrete-cosine transform apparatus 20 performs its function. The inverse discrete-cosine transform apparatus 100 may receive, for example, a discrete-cosine block identical to the following block (7) that is used when the apparatus 20 operates in the first mode.

$$\begin{bmatrix} D_{00} & D_{01} & D_{02} & D_{03} & D_{04} & D_{05} & D_{06} & D_{07} \\ D_{10} & D_{11} & D_{12} & D_{13} & D_{14} & D_{15} & D_{16} & D_{17} \\ D_{20} & D_{21} & D_{22} & D_{23} & D_{24} & D_{25} & D_{26} & D_{27} \\ D_{30} & D_{31} & D_{32} & D_{33} & D_{34} & D_{35} & D_{36} & D_{37} \\ D_{40} & D_{41} & D_{42} & D_{43} & D_{44} & D_{45} & D_{46} & D_{47} \\ D_{50} & D_{51} & D_{52} & D_{53} & D_{54} & D_{55} & D_{56} & D_{57} \\ D_{60} & D_{61} & D_{62} & D_{63} & D_{64} & D_{65} & D_{66} & D_{67} \\ D_{70} & D_{71} & D_{72} & D_{73} & D_{74} & D_{75} & D_{76} & D_{77} \end{bmatrix} \quad (7)$$

First, the apparatus 100 effects inverse discrete-cosine transform in the horizontal direction. Assume that the apparatus 100 receives the discrete-cosine coefficients of 8×8 discrete-cosine block (7) that is input in the form of a bit stream that extends in the horizontal direction and starts with a DC component.

The discrete-cosine coefficient $D_{00}$, i.e., the first coefficient input to the apparatus 100, is temporarily stored in the buffer section 101. Then, the coefficient $D_{00}$ is supplied to the multiplying section 102. The section 102 multiplies the coefficient $D_{00}$ by inverse transform coefficients K0 to K7. The coefficient $D_{00}$ multiplied by coefficients K0 to K7 is input to the selector section 103.

Consider the selector 103a provided in the selector section 103. The control section (not shown) controls the selector 103a in accordance with Table 12. That is, the control section causes the selector 103a to select one of the eight values K0·$D_{00}$, K1·$D_{00}$, K2·$D_{00}$, K3·$D_{00}$, K4·$D_{00}$, K5·$D_{00}$, K6·$D_{00}$ and K7·$D_{00}$, that have been output from the selectors 102a to 102h, respectively. The selector 103a outputs the value it has selected. Ordinal numbers 0 to 7 are assigned to the eight values output from the selectors 102a to 102h, respectively.

In Table 12, indices V0 to V7 are arranged in the vertical direction, and indices U0 to U7 are arranged in the horizontal direction. The indices V0 to V7 correspond to the selectors 103a to 103h, respectively. The indices U0 to U7 correspond to the ordinal numbers of the columns shown in the discrete-cosine block (7). As for the selector 103a, the index V0 intersects with index U0, i.e., the column number of the input discrete-cosine coefficient $D_{00}$, at the value of 0. The value 0 means numbers 0 to 7 allocated to the output values of the selectors 24a to 24h. The value the selector 103a outputs is therefore K0·$D_{00}$ that has been output from the selector 102a.

As for the other selectors 103b to 103h, the index V0 intersects with the index U0 at the value of 0 when the discrete-cosine coefficient $D_{00}$ is input, as can been seen from Table 12. Therefore, the control section causes the selectors 103b to 103h to select and output the value K0·$D_{00}$.

The value K0·$D_{00}$ output from the selector section 103 is input to the buffer section 104.

The control section causes the sign multiplying section 104 to multiply the value by the plus sign or the minus sign in accordance with Table 14. The indices V0 to V7 in the vertical direction correspond to the sign multipliers 104a to 104h. On the other hand, the indices U0 to U7 in the horizontal direction correspond to the column numbers shown in the discrete-cosine block (7), in the same way as is indicated in Table 12. The values shown in Table 14 are signs by which the values input to that the sign multiplying section 104 will be multiplied.

How the sign multiplier 104a, for example, operates will be explained. Assume that the sign multiplier 104a receives value K0·$D_{00}$ from the selector 103a. Under the control of the control section, the sign multiplier 104a multiplies the input value K0·$D_{00}$ by the plus sign, +1. The resultant value, K0·$D_{00}$, is output to the adder 105a of the addition section 105. At this time, the buffer 106a stores nothing at all. The adder 105a therefore adds 0 to K0·$D_{00}$. Hence, value K0·$D_{00}$ is output to buffer 106a and stored therein.

Similarly, the values output from the selectors 103b to 103h are multiplied by the plus sign or the minus sign in the sign multipliers 104b to 104h, respectively. The values obtained in the sign multipliers 104b to 104h are stored in the buffers 106b to 106h.

Assume that the value $D_{01}$ included in the discrete-cosine block (7) is input to the buffer section 101. In this case, the multiplying section 102 multiplies the value $D_{01}$ by inverse transform coefficients K0 to K7.

The control section causes the selectors 103a to 103h to select and output values, in accordance with Table 12. Hence, the selector 103a selects value 1 and therefore outputs the value supplied from the multiplier 102a. The selector 103b selects value 3 and thus outputs the value supplied from the multiplier 102d. The selector 103c selects value 5 and, hence, outputs the value supplied from the selector 102f. The selector 103d selects value 7 and therefore outputs the value supplied from the selector 102h. The selector 103e selects value 7 and, hence, outputs the value supplied from the selector 102h. The selector 103f selects value 5 and thus outputs the value supplied from the selector 102f. The selector 103g selects value 3 and therefore outputs the value supplied from the selector 102d. And the selector 103h selects value 1 and, hence, outputs the value supplied from the selector 102a.

The sign multipliers 104a to 104h receive the values K1·$D_{01}$, K3·$D_{01}$, K5·$D_{01}$, K7·$D_{01}$, K7·$D_{01}$, K5·$D_{01}$, K3·$D_{01}$, K1·$D_{01}$, respectively, which have been output from the buffers 103a to 103h. The sign multipliers 104a to 104h multiply these input values by +1, +1, +1, +1, −1, −1, −1 and −1, respectively. The products of the multiplication are output to the adding section 105.

The adding section 105 receives the values from the sign multiplying section 104 and adds them to the values stored in the buffer section 106. For example, the adder 105a receives the value K1·$D_{01}$ output from the sign multiplier 104a and adds the value to the value K0·$D_{00}$ stored in the buffer 106a. The resultant sum, K0·$D_{00}$+K1·$D_{01}$ is supplied from the adder 105a to the buffer 106a. The buffer 106a stores the sum K0·$D_{00}$+K1·$D_{01}$. The other adders 105b to 105h effectuate similar addition, and the sums obtained are stored into the buffers 106b to 106h. Thus, the values stored in the buffers 106a to 106h are updated.

When values $D_{02}$, $D_{03}$, $D_{04}$, $D_{05}$, $D_{06}$ and $D_{07}$, contained in the discrete-cosine block (7), are input to the buffer section 101, the apparatus 100 performs inverse discrete-cosine transform in the same way as explained above.

Thus, the inverse discrete-cosine transform apparatus 100 processes the discrete-cosine transform coefficients $D_{00}$ to $D_{07}$ in the horizontal direction, which are included in the discrete-cosine block (7), generating eight pixel data items for one column. The pixel data items are stored in the buffers 106a to 106h, respectively. The control section causes the buffers 106a to 106h to output the pixel data items. Thus, the apparatus 100 completes inverse discrete-cosine transform on the first column of image data.

The apparatus 100 repeats the sequence of operations, mentioned above, on the second column et seq. of the image data. When the apparatus 100 finishes inverse discrete-cosine transform on the last column, thus processing the discrete-cosine coefficient $D_{77}$, it completes first-dimension 8×8 discrete-cosine transform. The apparatus 100 may transpose the resultant 8×8 matrix, executes a similar transform on the matrix and transpose the matrix again, thereby accomplishing two-dimensional 8×8 discrete-cosine transform.

How the inverse discrete-cosine transform apparatus 100 operates in the fifth mode will be now described.

In the fifth mode, the apparatus 100 performs inverse discrete-cosine transform on, for example, a 4×4 discrete-cosine block (10) shown below.

$$\begin{bmatrix} D_{00} & D_{02} & D_{04} & D_{06} \\ D_{12} & D_{12} & D_{14} & D_{16} \\ D_{20} & D_{22} & D_{24} & D_{26} \\ D_{30} & D_{32} & D_{34} & D_{36} \end{bmatrix} \quad (10)$$

The discrete-cosine block (10) is a 4×4 block that has been generated by extracting high-frequency vertical components and some horizontal components from the discrete-cosine block (7).

First, the apparatus 100 effectuates inverse discrete-cosine transform in the horizontal direction. Assume that the 4×4 discrete-cosine block (10) is input the apparatus 100, in the form of a bit stream that extends in the horizontal direction and starts with a DC component.

The discrete-cosine coefficient $D_{00}$, i.e., the first coefficient input to the apparatus 100, is temporarily stored in the buffer section 101. Then, the coefficient $D_{00}$ is supplied to the multiplying section 102. The section 102 multiplies the coefficient $D_{00}$ by inverse transform coefficients K0 to K7. The coefficient $D_{00}$ multiplied by coefficients K0 to K7 is input to the selector section 103.

Consider the selector 103a of the selector section 103. The control section (not shown) controls the selector 103a in accordance with a Table composed of the shaded values shown in Table 13. That is, the control section causes the selector 103a to select one of the eight values K0·$D_{00}$, K1·$D_{00}$, K2·$D_{00}$, K3·$D_{00}$, K4·$D_{00}$, K5·$D_{00}$, K6·$D_{00}$ and K7·$D_{00}$, that have been output from the selectors 102a to 102h, respectively. The selector 103a outputs the value it has selected. Ordinal numbers 0 to 7 are assigned to the eight values output from the selectors 102a to 102h, respectively.

In Table 13, indices V0 to V3 are arranged in the vertical direction, and indices U0, U2, U4 and U6 are arranged in the horizontal direction. The indices V0 to V7 correspond to the selectors 103a to 103d, respectively. The indices U0, U2, U4 and U6 correspond to the ordinal numbers of the columns shown in the discrete-cosine block (10). As for the selector 103a, the index V0 intersects with index U0, i.e., the column number of the input discrete-cosine coefficient $D_{00}$, at the value of 0. The value 0 means numbers 0 to 7 allocated to the output values of the selectors 24a to 24h. The value the selector 103a outputs is therefore K0·$D_{00}$ that has been output from the selector 102a.

As for the other selectors 103b to 103d, the index V0 intersects with the index U0 at the value of 0 when the discrete-cosine coefficient $D_{00}$ is input, as can been seen from Table 12. Therefore, the control section causes the selectors 103b to 103d to select and output the value K0·$D_{00}$.

The value $K0 \cdot D_{00}$ output from the selector section 103 is input to the buffer section 104.

The control section causes the sign multiplying section 104 to multiply the value by the plus sign or the minus sign in accordance with the Table composed of the shaded values shown in Table 15. The indices V0 to V3 in the vertical direction correspond to the sign multipliers 104a to 104d. On the other hand, the indices U0, U2, U4 and U6 in the horizontal direction correspond to the column numbers shown in the discrete-cosine block (10), in the same way as is indicated in Table 12. The values shown in Table 15 are signs by which the values input to that the sign multiplying section 104 will be multiplied.

How the sign multiplier 104a, for example, operates will be explained. Assume that the sign multiplier 104a receives value $K0 \cdot D_{00}$ from the selector 103a. Under the control of the control section, the sign multiplier 104a multiplies the input value $K0 \cdot D_{00}$ by the plus sign, +1. The resultant value, $K0 \cdot D_{00}$, is output to the adder 105a of the addition section 105. At this time, the buffer 106a stores nothing at all. The adder 105a therefore adds 0 to $K0 \cdot D_{00}$. Hence, value $K0 \cdot D_{00}$ is output to buffer 106a and stored therein.

Similarly, the values output from the selectors 103b to 103d are multiplied by the plus sign or the minus sign in the sign multipliers 104b to 104d, respectively. The values obtained in the sign multipliers 104b to 104d are stored in the buffers 106b to 106d.

Assume that the value $D_{02}$ included in the discrete-cosine block (10) is input to the buffer section 101. In this case, the multiplying section 102 multiplies the value $D_{02}$ by inverse transform coefficients K0 to K7. The selector 103 selects the value $D_{02}$ multiplied by inverse transform coefficients K0 to K7.

The control section causes the selectors 103a to 103d to select and output values, in accordance with Table 13. Hence, the selector 103a selects value 2 and therefore outputs the value supplied from the multiplier 102c. The selector 103b selects value 6 and thus outputs the value supplied from the multiplier 102g. The selector 103c selects value 6 and, hence, outputs the value supplied from the selector 102g. The selector 103d selects value 2 and therefore outputs the value supplied from the selector 102c.

The sign multipliers 104a to 104d receive the values $K2 \cdot D_{02}$, $K6 \cdot D_{02}$, $K6 \cdot D_{02}$ and $K2 \cdot D_{02}$, respectively, which have been output from the buffers 103a to 103d. The sign multipliers 104a to 104d multiply these input values by +1, +1, −1 and −1, respectively. The products of the multiplication are output to the adding section 105.

The adding section 105 receives the values from the sign multiplying section 104 and adds them to the values stored in the buffer section 106. For example, the adder 105a receives the value $K2 \cdot D_{02}$ output from the sign multiplier 104a and adds the value $K2 \cdot D_{02}$ to the value $K0 \cdot D_{00}$ stored in the buffer 106a. The resultant sum, $K0 \cdot D_{00} + K2 \cdot D_{02}$ is supplied from the adder 105a to the buffer 106a. The buffer 106a stores the sum $K0 \cdot D_{00} + K2 \cdot D_{02}$. The other adders 105b to 105d effectuate similar addition, and the sums obtained are stored into the buffers 106b to 106d. Thus, the values stored in the buffers 106a to 106d are updated.

When values $D_{04}$ and $D_{06}$ contained in the discrete-cosine block (10), are input to the buffer section 101, the apparatus 100 performs inverse discrete-cosine transform in the same way as explained above.

Thus, the inverse discrete-cosine transform apparatus 100 processes the discrete-cosine transform coefficients $D_{00}$, $D_{02}$, $D_{04}$ and $D_{06}$, which are included in the discrete-cosine block (10), generating four pixel data items for one column. The pixel data items are stored in the buffers 106a to 106d, respectively. The control section causes the buffers 106a to 106d to output the pixel data items. Thus, the apparatus 100 completes inverse discrete-cosine transform on the first column of image data.

The apparatus 100 repeats the sequence of operations, mentioned above, on the second column et seq. of the image data. When the apparatus 100 finishes inverse discrete-cosine transform on the last column, thus processing the discrete-cosine coefficient $D_{36}$, it completes first-dimension 4×4 discrete-cosine transform. The apparatus 100 may transpose the resultant 4×4 matrix, executes a similar transform on the matrix and transpose the matrix again, thereby accomplishing two-dimensional 4×4 discrete-cosine transform.

As described above, in the inverse discrete-cosine transform apparatus 100, the multiplying section 102 multiplies the input discrete-cosine coefficients by the absolute values of inverse transform coefficients. The selector section 103 is controlled to output values that may be added in the adding section 105 in accordance with the rules of matrix calculus. The sign multiplying section 104 multiplies the absolute values of the inverse transform coefficients by the plus sign or the minus sign. The adding section 105 adds the outputs of the sign multiplying section 104 to the values output from the buffer section 106. Therefore, the apparatus 100 can perform inverse discrete-cosine transform in the fourth mode and the fifth mode, utilizing the same hardware. This simplifies the circuit configuration of the inverse discrete-cosine transform apparatus 100.

What is claimed is:

1. An inverse discrete-cosine transform apparatus for performing inverse discrete-cosine transform on a discrete-cosine block that is a matrix composed of at most 8×8 discrete-cosine coefficients, said apparatus comprising:

eight discrete-cosine transform multipliers for multiplying the discrete-cosine coefficients input in the form of a bit stream, by coefficients;

ten field, compression discrete-cosine transform multipliers for multiplying the discrete-cosine coefficients input in the form of a bit stream, by coefficients;

eight selecting means for receiving the discrete-cosine coefficients multiplied by the coefficients in the eight discrete-cosine transform multipliers and the discrete-cosine coefficients multiplied by the coefficients in the ten field, compression discrete-cosine transform multipliers;

control means for controlling the eight selecting means so that, when the discrete-cosine block is not subjected to field division, one of the values input from the eight discrete-cosine transform multipliers to the eight selecting means may be selected in accordance with the positions the discrete-cosine coefficients take in the discrete-cosine block and may then be output after a plus sign or a minus signal is added to the value selected, and when the discrete-cosine block is subjected to field division and the discrete-cosine coefficients are input in the from of a vertical bit stream, one of the values input from the ten field, compression discrete-cosine transform multipliers to the eight discrete-cosine transform multipliers may be in accordance with the positions the discrete-cosine coefficients take in the discrete-cosine block and may then be output after a plus sign or a minus signal is added to the value selected; and eight adding means associated with the eight selecting means, respectively, each for adding the values output from the associated selecting means, wherein each of the eight discrete-cosine transform multipliers has, as coefficient, any one of eight inverse discrete-cosine coefficients which are some of the elements of a first matrix applied to perform inverse discrete-cosine transform on the discrete-cosine block and which have absolute values not identical to those of any other elements of the first matrix, and each of the ten field, compression discrete-cosine transform multipliers has, as coefficient, any one of the ten inverse discrete-cosine coefficients which are some of the elements of a second matrix applied to perform field, compression discrete-cosine transform and which have absolute values not identical to those of any other elements of the second matrix.

2. The apparatus according to claim 1, which further comprises memory means storing a first Table and a second Table, said first Table showing relation between the values output from the eight selecting means and the positions the discrete-cosine coefficients take in the discrete-cosine block not subjected to field division, and the second Table showing relation between the values output from the eight selecting means and the positions the discrete-cosine coefficients take in the discrete-cosine block input in the from of a vertical bit stream and subjected to field division, and in which the control means causes the eight selecting means to output values in accordance with the first Table when the discrete-cosine block is not subjected to field division and to output values in accordance with the second Table when the discrete-cosine block is input in the from of a vertical bit stream and then subjected to field division.

3. An inverse discrete-cosine transform apparatus for performing inverse discrete-cosine transform on a discrete-cosine block that is a matrix composed of at most 8×8 discrete-cosine coefficients, said apparatus comprising:

eight multipliers for multiplying the discrete-cosine coefficients input in the form of a bit stream, by coefficients;

eight selecting means for receiving the discrete-cosine coefficients multiplied by the coefficients in the eight discrete-cosine transform multipliers;

control means for controlling the eight selecting means so that one of the values input from the eight discrete-cosine transform multipliers to the eight selecting means may be selected in accordance with the positions the discrete-cosine coefficients take in the discrete-cosine block and may then be output after a plus sign or a minus signal is added to the value selected, wherein said control means causes the eight selecting means to output values in accordance with a Table which shows a relation between the values output from the eight selecting means and the positions the discrete-cosine coefficients take in the discrete-cosine block, in which said Table is as follows:

| Index | U0 | U1 | U2 | U3 | U4 | U5 | U6 | U7 |
|---|---|---|---|---|---|---|---|---|
| V0 | 0 | 1 | 2 | 3 | 4 | 5 | 6 | 7 |
| V1 | 0 | 3 | 6 | 7 | 4 | 1 | 2 | 5 |
| V2 | 0 | 5 | 6 | 1 | 4 | 7 | 2 | 3 |
| V3 | 0 | 7 | 2 | 5 | 4 | 3 | 6 | 1 |
| V4 | 0 | 7 | 2 | 5 | 4 | 3 | 6 | 1 |
| V5 | 0 | 5 | 6 | 1 | 4 | 7 | 2 | 3 |
| V6 | 0 | 3 | 6 | 7 | 4 | 1 | 2 | 5 |
| V7 | 0 | 1 | 2 | 3 | 4 | 5 | 6 | 7 | eight adding means associated with the eight selecting means, respectively, each for adding the values output from the associated selecting means, wherein each of the eight multipliers has, as coefficient, any one of eight inverse discrete-cosine coefficients which are some of the elements of a matrix applied to perform inverse discrete-cosine transform on the discrete-cosine block and which have absolute values not identical to those of any other elements of the first matrix.

4. The apparatus according to claim 3, which further comprises memory means storing said Table.

* * * * *